US008151753B2

(12) United States Patent
Kamiyama et al.

(10) Patent No.: US 8,151,753 B2
(45) Date of Patent: Apr. 10, 2012

(54) WARM-UP SYSTEM AND WARM-UP METHOD FOR IN-VEHICLE POWER TRAIN

(75) Inventors: Naohisa Kamiyama, Ashikaga (JP); Shiro Nakajima, Tochigi (JP); Satoshi Tamagawa, Sano (JP); Ryoichi Hori, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 706 days.

(21) Appl. No.: 12/210,407

(22) Filed: Sep. 15, 2008

(65) Prior Publication Data
US 2009/0071428 A1 Mar. 19, 2009

(30) Foreign Application Priority Data

| Sep. 18, 2007 | (JP) | 2007-241006 |
| Sep. 28, 2007 | (JP) | 2007-254946 |
| Jun. 10, 2008 | (JP) | 2008-151881 |

(51) Int. Cl.
*B60H 1/03* (2006.01)
(52) U.S. Cl. ........... 123/142.5 R; 123/543; 123/142.5 E
(58) Field of Classification Search ........... 123/142.5 R, 123/543, 142.5 E
See application file for complete search history.

(56) References Cited

U.S. PATENT DOCUMENTS

| 3,767,932 | A | * | 10/1973 | Bailey | 290/38 R |
| 4,372,260 | A | * | 2/1983 | Baker | 123/142.5 E |
| 4,393,817 | A | * | 7/1983 | Lindberg | 123/3 |
| 4,398,081 | A | * | 8/1983 | Moad | 219/202 |
| 4,415,847 | A | * | 11/1983 | Galloway | 320/150 |
| 4,520,603 | A | * | 6/1985 | Brogie | 52/173.1 |
| 4,538,134 | A | * | 8/1985 | Carey | 337/113 |
| 4,815,426 | A | * | 3/1989 | Henschel | 123/142.5 R |
| 4,906,337 | A | * | 3/1990 | Palmer | 202/160 |
| 5,285,963 | A | * | 2/1994 | Wakefield et al. | 237/2 A |
| 5,304,286 | A | * | 4/1994 | Palmer | 202/167 |
| 5,853,068 | A | * | 12/1998 | Dixon et al. | 184/1.5 |

FOREIGN PATENT DOCUMENTS

| JP | 2874449 B2 | 1/1999 |
| JP | 2006-321389 A | 11/2006 |

* cited by examiner

*Primary Examiner* — Noah Kamen
*Assistant Examiner* — Long T Tran
(74) *Attorney, Agent, or Firm* — Foley & Lardner LLP

(57) ABSTRACT

In a warm-up system that pre-warms up of an engine (E) by transferring heat from a heat source to an engine cooling water circulation circuit (1) of a vehicle, a residential hot water circuit (2) that uses a household heat source is provided as the heat source, and a one-touch connector (3) is provided in the engine cooling water circulation circuit (1) and the residential hot water circuit (2). The one-touch connector (3) connects the two circuits (1, 2) prior to start-up of the engine (E) such that heat is transferred to the engine cooling water circulation circuit (1), and disconnects the two circuits (1, 2) following heat transfer in preparation for start-up of the engine (E).

19 Claims, 13 Drawing Sheets

WARM-UP SYSTEM AND WARM-UP METHOD FOR IN-VEHICLE POWER TRAIN

FIELD OF INVENTION

This invention relates to a warm-up system and a warm-up method that pre-warm up of an in-vehicle power train such as an engine, a transmission, or a motor by transferring heat from a heat source to a vehicle side warm-up circuit.

DESCRIPTION OF THE RELATED ART

A hybrid vehicle having an environment-responsive power train, demand for which is expected to increase in the coming years, discharges a smaller amount of heat than a vehicle having a conventional engine. During cold periods, therefore, the internal temperature of the vehicle cabin remains low for a while after the vehicle has begun to advance, and hence the heating performance of this type of hybrid vehicle is deficient.

Further, pre-warming up of the engine and transmission is equally as important in terms of achieving an improvement in fuel economy as enhancing the fuel economy performance of the engine itself. An operating method for a power-generating internal combustion engine of a hybrid vehicle in which an exhaust gas catalyst is pre-heated before starting the internal combustion engine is known as a method of pre-warming up (JP2874449B). A vehicle waste heat usage device that pre-warms up by recovering waste heat in a hybrid vehicle having an engine cooling circuit and a motor cooling circuit is also known (JP2006-321389A).

DISCLOSURE OF THE INVENTION

In the conventional operating method for a power-generating internal combustion engine of a hybrid vehicle, a larger amount of fuel than normal must be injected during engine combustion control for heating and warm-up purposes, and this leads to deterioration of the fuel economy.

Further, in the conventional vehicle waste heat usage device, exhaust heat recovery and heat storage produce an increase in the number of components and a corresponding increase in weight, and therefore the effects of the device cannot always be exhibited sufficiently. Moreover, the addition of components, system circuits, and complicated control leads to an increase in cost.

Furthermore, both of these conventional techniques employ an internal heat source of the vehicle, and therefore, when the vehicle is started on cold ground, during winter, and so on, a time period of at least several minutes is required to complete engine warm-up from the point at which the engine is started. Hence, an instantaneous warm-up effect is not obtained.

This invention has been designed in consideration of these problems, and it is an object thereof to provide a warm-up system and a warm-up method which can respond to these problems at low weight/low cost, without the need for additional complicated components and control, and with which a warm-up effect can be obtained instantaneously when a user enters a vehicle.

To achieve this object, a first aspect of this invention is a warm-up system that pre-warms up of an in-vehicle power train by transferring heat from a heat source to a vehicle side warm-up circuit, comprising:

a heat source circuit that circulates heat from the heat source; and a connector provided on the vehicle side warm-up circuit and the heat source circuit, which connects the two circuits prior to start-up of the in-vehicle power train such that heat is transferred to the vehicle side warm-up circuit, and disconnects the two circuits following transfer of the heat.

Another aspect of this invention is a warm-up method for an in-vehicle power train, which pre-warms up of the in-vehicle power train by transferring heat from a heat source to a vehicle side warm-up circuit, having a residence side heat source circuit employing a household heat source as the heat source, and a connector that is capable of connecting and disconnecting the vehicle side warm-up circuit and the residence side heat source circuit, the warm-up method comprising:

a circuit connection procedure for connecting the vehicle side warm-up circuit and the residence side heat source circuit by connecting the connector prior to start-up of the in-vehicle power train;

a household thermal energy transfer procedure for transferring heat from the residence side heat source circuit to the vehicle side warm-up circuit when the vehicle side warm-up circuit and the residence side heat source circuit are in a connected state; and a circuit disconnection procedure for disconnecting the vehicle side warm-up circuit and the residence side heat source circuit by disconnecting the connector following heat transfer to the vehicle side warm-up circuit side.

Hence, in the warm-up system and warm-up method according to an aspect of this invention, the vehicle side warm-up circuit and the residence side heat source circuit are connected by connecting the connector prior to start-up of the in-vehicle power train. Then, when the two circuits are in a connected state, heat is transferred from the residence side heat source circuit to the vehicle side warm-up circuit. Once heat has been transferred to the vehicle side warm-up circuit side, the vehicle side warm-up circuit and residence side heat source circuit are disconnected by disconnecting the connector.

In other words, external thermal energy is used to pre-warm up of the in-vehicle power train. For example, long life coolant (LLC) is used as both the cooling water of a vehicle and hot water for household floor heating, and hot water from a household floor heating hot water circuit is transmitted to an engine cooling water circulation circuit of the vehicle.

Only branch pipes and a connector, for example, need be provided as additional vehicle side components, and therefore the need to add complicated components and control is eliminated, enabling reductions in weight and cost.

Further, heat is transferred to the vehicle side warm-up circuit in advance, before a user enters the vehicle, and therefore an instantaneous warm-up effect is obtained when the user enters the vehicle. Hence, in comparison with conventional engine warm-up performed by raising the temperature of the engine cooling water, for example, the user does not feel cold at the initial stage of engine warm-up, and since there is no need to increase a fuel injection amount, an improvement in fuel economy is achieved.

As a result, a warm-up effect can be obtained at low weight/low cost, without the need to add complicated components and control.

The details as well as other features and advantages of this invention are set forth in the remainder of the specification and are shown in the accompanying drawings.

DETAILED DESCRIPTION OF THE PREFERRED EMBODIMENTS

Embodiments of a warm-up system and a warm-up method according to this invention will be described below on the basis of the drawings.

First Embodiment

Figure 1:
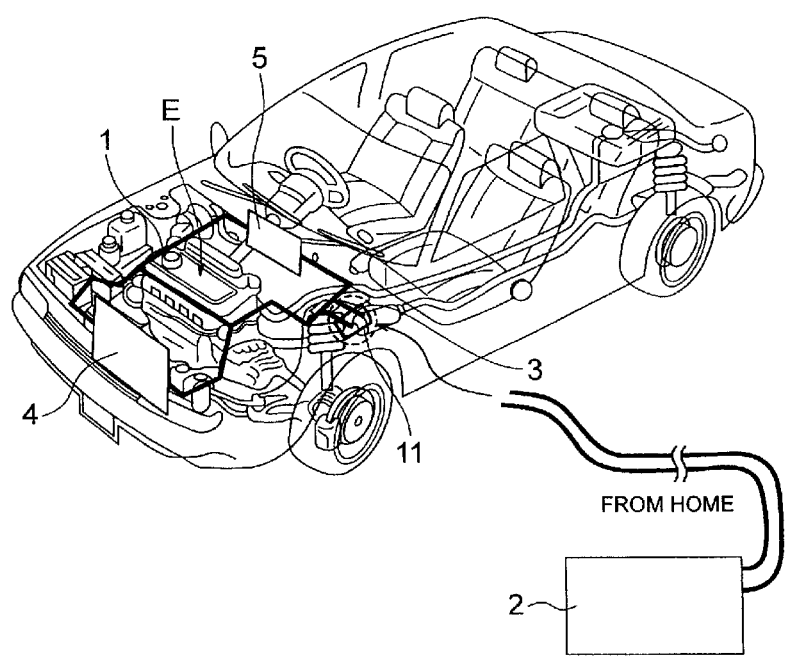
FIG. 1 is a perspective view of a vehicle comprising an engine warm-up system according to a first embodiment.
Figure 2:
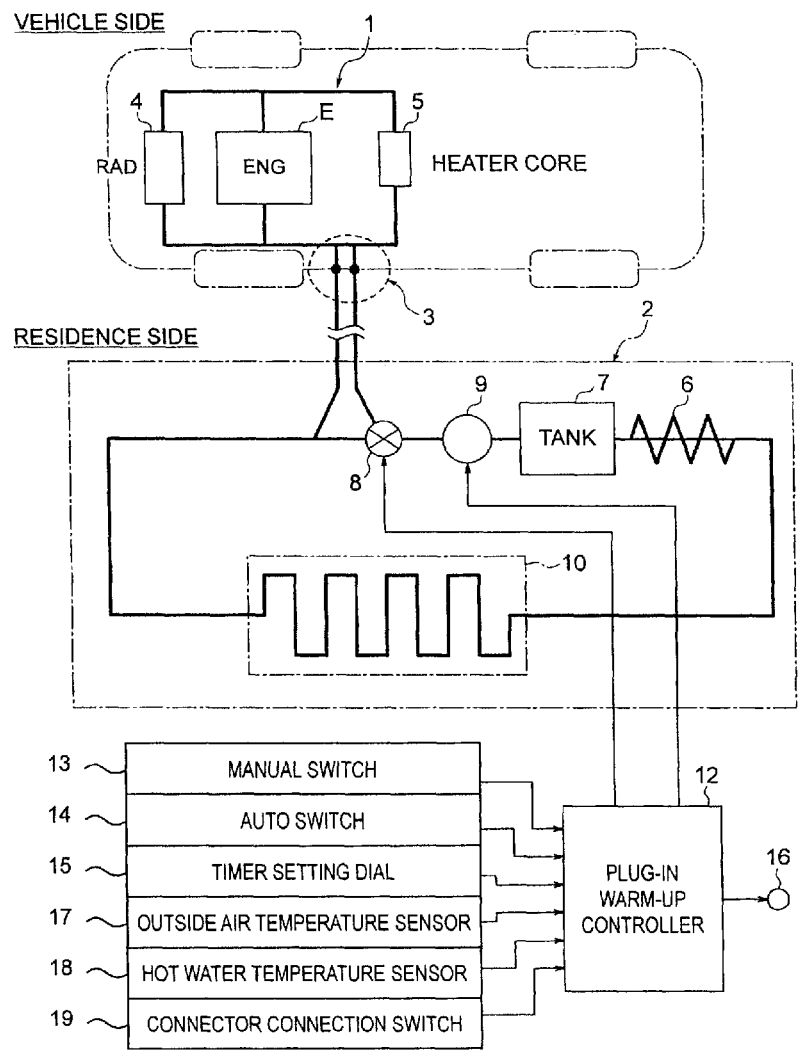
FIG. 2 is an illustrative view of the engine warm-up system according to the first embodiment.
Figure 3:
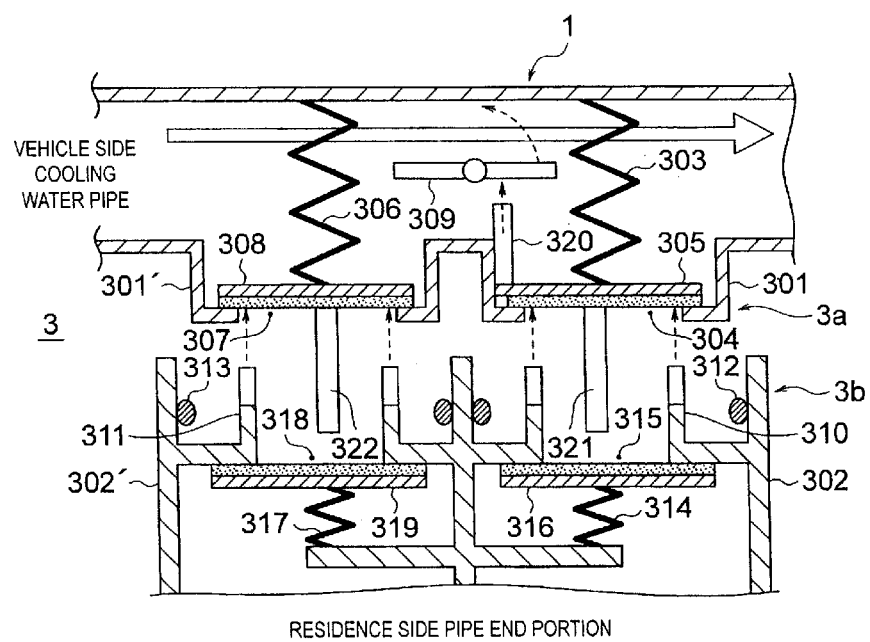
FIG. 3 is a sectional view showing a state in which a connector of the engine warm-up system according to the first embodiment is disconnected.
Figure 4:
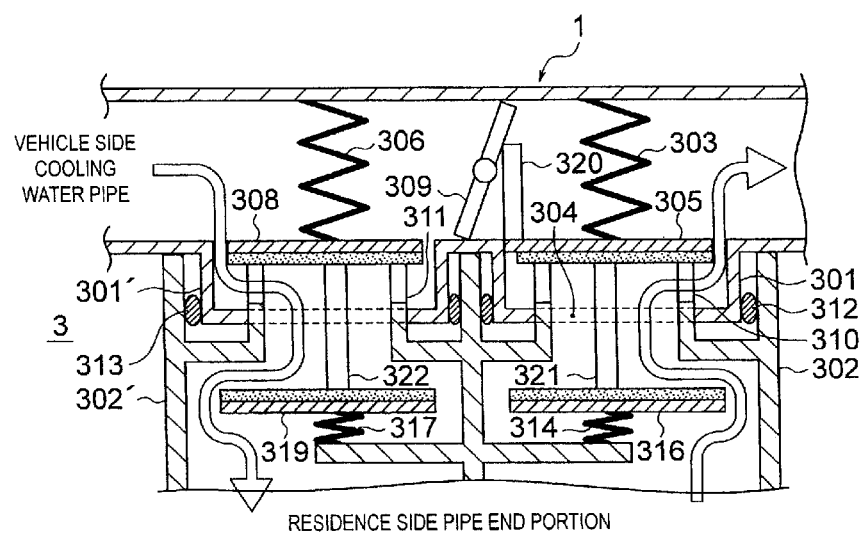
FIG. 4 is a sectional view showing a state in which the connector of the engine warm-up system according to the first embodiment is connected.

First, the constitution of this embodiment will be described. FIG. 1 is a perspective view showing an engine vehicle to which a warm-up system and a warm-up method for an engine (serving as an example of an in-vehicle power train) according to the first embodiment are applied. FIG. 2 is an illustrative view showing the engine warm-up system according to the first embodiment. FIG. 3 is a sectional view showing a state in which a connector of the engine warm-up system according to the first embodiment is disconnected immediately prior to connection. FIG. 4 is a sectional view showing a state in which the connector of the engine warm-up system according to the first embodiment is connected.

As shown in FIG. 1, the engine warm-up system according to the first embodiment pre-warms up of an engine E by transferring heat from a heat source to an engine cooling water circulation circuit 1 (vehicle side warm-up circuit) of the vehicle. A residential hot water circuit 2 (heat source circuit) using a household heat source is provided as the heat source. The engine cooling water circulation circuit 1 and the residential hot water circuit 2 include a one-touch connector 3 (connector) that connects the two circuits 1, 2 prior to start-up of the engine E such that heat is transferred to the engine cooling water circulation circuit 1, and disconnects the two circuits 1, 2 following heat transfer.

As shown in FIG. 2, the engine cooling water circulation circuit 1 connects the engine E, a radiator 4, and a heater core 5 in parallel. Long life coolant (LLC) is used as the engine cooling water. The heater core 5 is disposed in a case of an air-conditioning unit that heats the vehicle cabin.

As shown in FIG. 2, the residential hot water circuit 2 is a circuit through which a household floor heating medium, which is heated by a heater 6 using nighttime electricity, gas, or the like and stored in a tank 7, circulates. The same long life coolant as the engine cooling water is employed as the medium. In other words, the engine cooling water circulation circuit 1 and the residential hot water circuit 2 use the same medium.

As shown in FIG. 2, the residential hot water circuit 2 comprises a hot water circulation switch valve 8 that switches the hot water to the vehicle circulation side during heat transfer, and a circulation pump 9 that circulates the hot water through the residential hot water circuit 2 and the engine cooling water circulation circuit 1. Further, as shown in FIG. 2, the residential hot water circuit 2 comprises a floor heating heat exchanger 10 that circulates hot water by switching the hot water circulation switch valve 8 to the residential hot water circuit 2 side and driving the circulation pump 9, and performs floor heating by introducing the hot water stored in the tank 7 into the residential hot water circuit 2.

As shown in FIG. 3, the one-touch connector 3 comprises a vehicle side jack 3a having first branch pipes 301, 301', which bifurcate from the engine cooling water circulation circuit 1, in certain positions thereof, and a residence side plug 3b having second branch pipes 302, 302', which bifurcate from the residential hot water circuit 2, in certain positions thereof.

As shown in FIG. 4, the one-touch connector 3 is set in a connected state simply by performing a connection operation on the vehicle side jack 3a and the residence side plug 3b, whereby the first branch pipes 301, 301' and second branch pipes 302, 302' communicate with each other. As shown in FIG. 3, the one-touch connector 3 is set in a disconnected state simply by performing a disconnection operation on the vehicle side jack 3a and the residence side plug 3b, whereby the first branch pipes 301, 301' and second branch pipes 302, 302' are disconnected.

In the disconnected state shown in FIG. 3, an inlet opening 304 of the vehicle side jack 3a is closed by an inlet lid 305 due to the biasing force of a spring 303 provided in the first branch pipe 301, and an outlet opening 307 is closed by an outlet lid 308 due to the biasing force of a spring 306 provided in the first branch pipe 301'. In this state, a butterfly valve 309 in the engine cooling water circulation circuit 1 is open. Thus, the engine cooling water flows in the direction of an arrow such that the engine cooling water circulation circuit 1 is formed normally.

In the disconnected state shown in FIG. 3, an inlet opening 315 of the residence side plug 3b is closed by an inlet lid 316 due to the biasing force of a spring 314 provided in the second branch pipe 302, and an outlet opening 318 is closed by an outlet lid 319 due to the biasing force of a spring 317 provided in the second branch pipe 302'.

On the other hand, in the connected state shown in FIG. 4, inlet pushing end portions 310, 310 formed in the second branch pipe 302 of the vehicle side jack 3a push the inlet lid 305 against the biasing force of the spring 303 such that the inlet opening 304 opens, and outlet pushing end portions 311, 311 formed in the second branch pipe 302' push the outlet lid 308 against the biasing force of the spring 306 such that the outlet opening 307 opens. The butterfly valve 309 provided in a position between the inlet opening 304 and outlet opening 307 of the engine cooling water circulation circuit 1 is pushed closed by a first pushing rod 320 formed on the inlet lid 305.

In the connected state shown in FIG. 4, a second pushing rod 321 formed on the inlet lid 305 of the residence side plug 3b pushes the inlet lid 316 against the biasing force of the spring 314 such that the inlet opening 315 opens, and a third pushing rod 322 formed on the outlet lid 308 pushes the outlet lid 319 against the biasing force of the spring 317 such that the outlet opening 318 opens.

Hence, in the connected state, hot water from the residential hot water circuit 2 flows into the engine cooling water circulation circuit 1 in the direction of the arrow through the inlet openings 315, 304. Further, engine cooling water from the engine cooling water circulation circuit 1 flows out to the residential hot water circuit 2 in the direction of the arrow through the outlet openings 307, 318. It should be noted that the second branch pipes 302, 302' are provided with an inlet side O-ring 312 and an outlet side O-ring 313 to secure a water-tight seal in the connected state.

As shown in FIG. 1, the vehicle side jack 3a of the one-touch connector 3 includes an open-close lid 11 provided on the periphery of a vehicle fender (the periphery of a tire house on a vehicle body side face) so as to open when the residence side plug 3b is connected and close when the residence side plug 3b is disconnected. The open-close lid 11 is shaped so as to form an integral continuous surface with a vehicle body outer panel surface when closed, similarly to a gasoline filler opening, for example.

Next, the constitution of a plug-in warm-up control system of the engine warm-up system according to the first embodiment will be described. In this embodiment of the invention, "plug-in warm-up" refers to warm-up in which the engine E is pre-warmed up using hot water from the residential hot water circuit 2 when the residence side plug 3b of the connector 3 is connected (plugged in) to the vehicle side jack 3a.

As shown in FIG. 2, the plug-in warm-up control system includes a plug-in warm-up controller 12 serving as a calculation processing circuit. The plug-in warm-up controller 12 includes an operation panel. The operation panel comprises a manual switch 13, an auto switch 14 (automatic warm-up switch), a timer setting dial 15 (timer setting mechanism), and an operation lamp 16.

Further, sensor signals and switch signals are input into the plug-in warm-up controller 12 from an outside air temperature sensor 17, a hot water temperature sensor 18, a connector connection switch 19 (connector connection detection mechanism), and so on. The plug-in warm-up controller 12 also outputs control commands to the hot water circulation switch valve 8 and the circulation pump 9.

Figure 5:
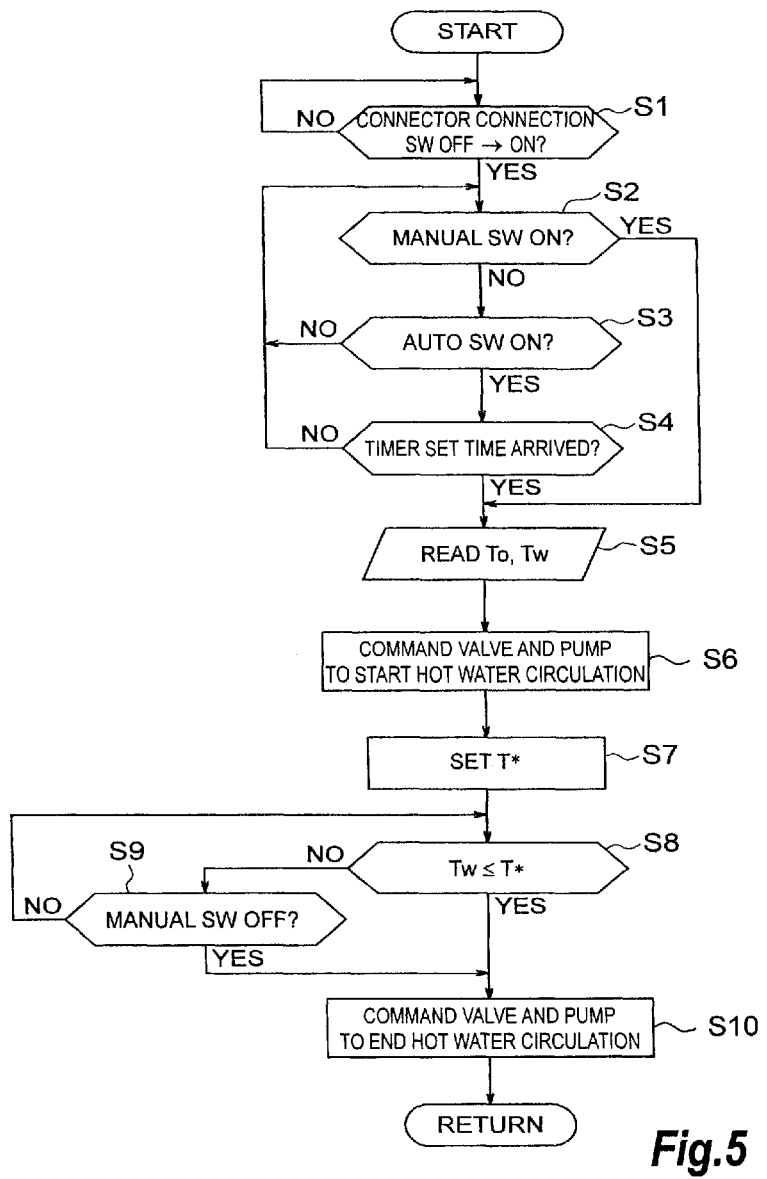
FIG. 5 is a flowchart of plug-in warm-up control processing according to the first embodiment.

FIG. 5 is a flowchart of plug-in warm-up control processing executed by the plug-in warm-up controller 12, according to the first embodiment. Each step of this flowchart will be described below.

In a step S1, the plug-in warm-up controller 12 determines whether or not a switch signal from the connector connection switch 19 has shifted from OFF to ON. When the determination is affirmative, the routine advances to a step S2, and when the determination is negative, the determination of the step S1 is repeated. The plug-in warm-up controller 12 determines that the switch signal from the connector connection switch 19 has varied in the step S1 when a plug-in operation is performed to connect the residence side plug 3b to the vehicle side jack 3a in the one-touch connector 3.

After determining that a plug-in operation has been performed in the step S1, the plug-in warm-up controller 12 determines in the step S2 whether or not a switch signal from the manual switch 13 is ON. When the determination is affirmative, the routine advances to a step S5, and when the determination is negative, the routine advances to a step S3. In the first embodiment, manual control and automatic control may be selected as the plug-in warm-up control. However, manual control through an operation of the manual switch 13 is performed in preference to automatic control.

After determining that the switch signal from the manual switch 13 is OFF in the step S2, the plug-in warm-up controller 12 determines in the step S3 whether or not a switch signal from the auto switch 14 is ON. When the determination is affirmative, the routine advances to a step S4, and when the determination is negative, the routine returns to the step S2.

After determining that the switch signal from the auto switch 14 is ON in the step S3, the plug-in warm-up controller 12 determines in the step S4 whether or not a set time set by the timer setting dial 15 has arrived. When the determination is affirmative, the routine advances to the step S5, and when the determination is negative, the routine returns to the step S2. The timer setting dial 15 sets an operation start time such that the flow of hot water into the vehicle is terminated before (10 minutes before, for example) an engine operation begins. A wait time such as XX hours XX minutes from now or a clock time such as 6 am may be set as the set time.

After determining that the manual switch 13 is ON in the step S2 or determining that the timer set time has arrived in the step S4, the plug-in warm-up controller 12 reads a current outside air temperature To from the outside air temperature sensor 17 and a current hot water temperature Tw from the hot water temperature sensor 18 in the step S5, whereupon the routine advances to a step S6.

After reading the outside air temperature To and the hot water temperature Tw in the step S5, the plug-in warm-up controller 12 outputs a command to the hot water circulation switch valve 8 to switch the hot water to the engine cooling circulating circuit 1 to circulate the hot water and outputs a command to drive the circulation pump 9 in the step S6, whereupon the routine advances to a step S7. It should be noted that the circulation pump 9 is also drive-controlled on a household heating controller side, and therefore, when the pump is already in a driven state for the purpose of floor heating control, the pump driven state is maintained.

After outputting the hot water circulation start commands to the hot water circulation switch valve 8 and the circulation pump 9 in the step S6, the plug-in warm-up controller 12 sets a target warm-up temperature T* in the step S7 on the basis of the outside air temperature To and hot water temperature Tw read in the step S5, whereupon the routine advances to a step S8. An example of the manner in which the target warm-up temperature T* is set will now be described. The engine cooling water temperature can be estimated from the outside air temperature To, and therefore temperature increases in the engine cooling water during circulation of the engine cooling water and the hot water at various temperature differences between the hot water temperature and the engine cooling water temperature are determined in advance through experiment and plotted on a map. The target warm-up temperature T* is then set by determining the temperature increase in the engine cooling water from the temperature difference between the hot water temperature Tw and the outside air temperature To and the map, and adding this temperature increase to the outside air temperature To.

After setting the target warm-up temperature T* in the step S7, the plug-in warm-up controller 12 determines in the step S8 whether or not the hot water temperature Tw from the hot water temperature sensor 18 is equal to or lower than the target warm-up temperature T*. When the determination is affirmative, the routine advances to a step S10, and when the determination is negative, the routine advances to a step S9. The hot water temperature Tw decreases gradually due to circulation blending of the hot water with the engine cooling water. When the hot water temperature Tw falls to or below the target warm-up temperature T*, it may be assumed that engine warm-up through circulation blending of the hot water with the engine cooling water is complete. It should be noted that approximately 30 seconds are required for the hot water and the engine cooling water to circulate and blend, and therefore the completion of engine warm-up may be estimated by means of timer management from the start of circulation.

After determining that Tw≦T* in the step S8, the plug-in warm-up controller 12 determines in the step S9 whether or not the switch signal from the manual switch 13 is OFF. When the determination is affirmative, the routine advances to a step S10, and when the determination is negative, the routine returns to the step S8.

After determining that Tw≦T* in the step S8 or determining that the manual switch 13 is OFF in the step S9, the plug-in warm-up controller 12 outputs a command to the hot water circulation switch valve 8 to switch the hot water to the hot water circulation circuit side and outputs a command to halt the circulation pump 9 in the step S10, whereupon the routine returns. The circulation pump 9 is also drive-controlled on the household heating controller side, and therefore, when a pump drive command has been issued on the floor heating control side, the pump driven state is maintained without halting the circulation pump 9.

Next, a technique of pre-warming up of the vehicle will be described. Conventionally, vehicle is pre-warmed up using methods of increasing the engine rotation speed, recovering waste heat, storing heat, and so on. Of these methods, when the engine rotation speed is increased, fuel consumption also increases, leading to deterioration of the fuel economy. Furthermore, all methods of increasing the engine rotation speed, recovering waste heat, and storing heat employ thermal energy generated by the vehicle itself. Therefore, when the vehicle is started on cold ground, during winter, and so on, a time period of at least several minutes is required to complete engine warm-up from the point at which the engine is started. Hence, an instantaneous warm-up effect is not obtained.

Meanwhile, with the development of environment-responsive techniques for improving fuel economy, hybrid vehicles, biofuel engine vehicles, idle-stop vehicles, and so on have been proposed. However, these vehicles aim to reduce the amount of thermal energy generated by the vehicle itself, and are therefore less conducive to pre-warming up than conventional engine vehicles.

In other words, to achieve a desired improvement in fuel economy, pre-warmed up of the engine, transmission and so on is equally important in a vehicle that employs an environment-responsive technique as in a conventional engine vehicle. However, improvements in environment-responsive techniques lead to larger reductions in the amount of thermal energy generated by the vehicle itself, and therefore a deficit in the amount of thermal energy used for warm-up occurs in comparison with a conventional engine vehicle.

This inventor focuses on the following points: the inability to obtain an instantaneous warm-up effect when thermal energy generated by the vehicle itself is used; the use of external thermal energy instead of the thermal energy generated by the vehicle itself; and the use of a household heating medium or waste heat, for example, as the external thermal energy.

In accordance with these points, the inventor proposes a warm-up system employing plug-in warm-up and having the following functions: circulating a household heating medium (hot water) to the vehicle when the ignition is OFF; providing a connector with a structure that is as user-friendly as possible; and controlling a timer function such that warm-up is completed before engine start-up.

Next, actions of this embodiment will be described. The actions of the engine warm-up system according to the first embodiment will be described in order of a "plug-in warm-up action during a manual operation", and an "auto plug-in warm-up action during automatic control".

[Plug-In Warm-Up Action During a Manual Operation]

When the need arises to operate a vehicle that is parked at home on cold ground, during winter, and so on at an unexpected hour, for example, a user performs plug-in warm-up through a manual operation. First, the user goes to the parking space, opens the open-close lid 11 before starting the engine E, and connects the residence side plug 3b to the exposed vehicle side jack 3a. As a result of this operation to connect the one-touch connector 3, the engine cooling water circulation circuit 1 is connected to the residential hot water circuit 2 (circuit connection procedure).

The user then operates the manual switch 13 provided on the operating panel of the plug-in warm-up controller 12 to switch the manual switch 13 ON. As a result, the operation advances from the step S1 to the steps S2, S5 and S6 of the flowchart in FIG. 5. In the step S6, the plug-in warm-up controller 12 outputs a command to the hot water circulation switch valve 8 to switch the hot water to the vehicle circulation side and outputs a command to drive the circulation pump 9. The operation then advances from the step S6 to the steps S7, S8 and S9 of the flowchart in FIG. 5, and by repeating the processing of the step S8 and the step S9, heat is transferred to the engine cooling water circulation circuit 1.

When the engine cooling water circulation circuit 1 and the residential hot water circuit 2 are thus connected, the hot water in the residential hot water circuit 2 flows into the engine cooling water circulation circuit 1. Meanwhile, the low-temperature engine cooling water in the engine cooling water circulation circuit 1 flows into the residential hot water circuit 2. When the hot water circulation produced by this flow is performed repeatedly, heat is transferred from the residential hot water circuit 2 to the engine cooling water circulation circuit 1, and as a result, the temperature of the engine cooling water rises (household thermal energy transfer procedure).

The user waits for a while, leaving the manual switch 13 ON. The user may switch the manual switch 13 provided on the operating panel of the plug-in warm-up controller 12 OFF before the engine warm-up completion condition of the step S8 is established. When the manual switch 13 is switched OFF, the operation advances from the step S9 to the step S10 of the flowchart in FIG. 5. In the step S10, the plug-in warm-up controller 12 outputs a command to the hot water circulation switch valve 8 to switch to the hot water circuit side, and when floor heating is not underway, outputs a command to halt the circulation pump 9 (completion of warm-up through manual operation).

When the engine warm-up completion condition of the step S8 is established after waiting for a while with the manual switch 13 switched ON, the operation advances from the step S8 to the step S10 of the flowchart in FIG. 5. In the step S10, the plug-in warm-up controller 12 outputs a command to the hot water circulation switch valve 8 to switch to the hot water circuit side, and when floor heating is not underway, outputs a command to halt the circulation pump 9 (completion of warm-up through automatic control).

The user then performs an operation to disconnect the one-touch connector 3 by disconnecting the residence side plug 3b from the vehicle side jack 3a and closing the open open-close lid 11, and as a result, the engine cooling water circulation circuit 1 is disconnected from the residential hot water circuit 2 (circuit disconnection procedure).

When the user enters the vehicle and starts the engine after performing these procedures, an instantaneous engine warm-up effect is obtained due to the plug-in warm-up action. As a result, the vehicle cabin is warmed up by the heater core 5 from the initial stage of engine warm-up, and therefore the user does not feel cold. Moreover, since there is no need to increase a fuel injection amount, an improvement in fuel economy is achieved.

[Auto Plug-In Warm-Up Action During Automatic Control]

When a vehicle parked at home on cold ground, during winter, and so on is operated at an identical commuting time every morning, for example, the user performs auto plug-in warm-up through automatic control. First, having returned home the previous evening, parked the vehicle, stopped the engine, and alighted from the vehicle, the user opens the open-close lid 11 and connects the residence side plug 3b to the exposed vehicle side jack 3a. As a result of this operation to connect the one-touch connector 3, the engine cooling water circulation circuit 1 is connected to the residential hot water circuit 2 (circuit connection procedure).

The user then operates the auto switch 14 provided on the operating panel of the plug-in warm-up controller 12 to switch the auto switch 14 ON. Then, after setting a warm-up start time using the timer setting dial 15, the user walks away from the vehicle. It should be noted that when warm-up is begun at a fixed time every day, the setting operation using the timer setting dial 15 is not required.

When this automatic setting operation is performed, the operation advances from the step S1 to the steps S2, S3 and S4 of the flowchart in FIG. 5. In the step S4, the plug-in warm-up controller 12 waits for warm-up to begin by performing the processing of the steps S2, S3 and S4 repeatedly until the timer set time arrives.

On the following morning, when the plug-in warm-up controller 12 determines in the step S4 that the timer set time has arrived, the operation advances from the step S4 to the steps S5 and S6. In the step S6, the plug-in warm-up controller 12 outputs a command to the hot water circulation switch valve 8 to switch the hot water to the vehicle circulation side and outputs a command to drive the circulation pump 9. The operation then advances from the step S6 to the steps S7, S8 and S9, and by repeating the processing of the step S8 and the step S9, heat is transferred to the engine cooling water circulation circuit 1.

When the engine cooling water circulation circuit 1 and the residential hot water circuit 2 are thus connected, the hot water in the residential hot water circuit 2 flows into the engine cooling water circulation circuit 1. Meanwhile, the low-temperature engine cooling water in the engine cooling water circulation circuit 1 flows into the residential hot water circuit 2. When the hot water circulation produced by this flow is performed repeatedly, heat is transferred from the residential hot water circuit 2 to the engine cooling water circulation circuit 1, and as a result, the temperature of the engine cooling water rises (household thermal energy transfer procedure).

When engine warm-up progresses such that the engine warm-up completion condition of the step S8 is established, the operation advances from the step S8 to the step S10 of the flowchart in FIG. 5. In the step S10, the plug-in warm-up controller 12 outputs a command to the hot water circulation switch valve 8 to switch to the hot water circuit side, and when floor heating is not underway, outputs a command to halt the circulation pump 9.

Having subsequently arrived at the parking space in order to enter the vehicle, the user performs an operation to disconnect the one-touch connector 3 by disconnecting the residence side plug 3b from the vehicle side jack 3a and closing the open open-close lid 11, and as a result, the engine cooling water circulation circuit 1 is disconnected from the residential hot water circuit 2 (circuit disconnection procedure).

When the user enters the vehicle and starts the engine after performing these procedures, an instantaneous engine warm-up effect is obtained due to the plug-in warm-up action. As a result, the vehicle cabin is warmed up by the heater core 5 from the initial stage of engine warm-up, and therefore the user does not feel cold. Moreover, since there is no need to increase the fuel injection amount, an improvement in fuel economy is achieved.

When the user forgets to disconnect the one-touch connector 3, enters the vehicle, and attempts to start the engine E, the plug-in warm-up controller 12 informs the user that the one-touch connector 3 is still connected by generating a buzzer noise or illuminating a lamp, regardless of whether a manual operation or automatic control has been performed. In this case, a warning function using a switch signal from the connector connection switch 19 is added to a warning control system provided on the vehicle side. As well as issuing a warning, the vehicle side warning control system may prohibit start-up of the engine E until disconnection of the one-touch connector 3 is confirmed.

Next, effects of this embodiment will be described. The warm-up system and warm-up method of the first embodiment exhibit the following effects.

(1) A warm-up system that pre-warms up of an in-vehicle power train by transferring heat from a heat source to a vehicle side warm-up circuit includes: a heat source circuit that circulates heat from the heat source; and a connector that connects the vehicle side warm-up circuit and the heat source circuit prior to start-up of the in-vehicle power train such that heat from the heat source circuit is transferred to the vehicle side warm-up circuit, and disconnects the vehicle side warm-up circuit and the heat source circuit following transfer of the heat. Therefore, pre-warm up can be done at low weight/low cost, without the need for additional complicated components and control. Moreover, an instantaneous warm-up effect can be obtained as soon as the user enters the vehicle.

(2) The vehicle side warm-up circuit is the engine cooling water circulation circuit 1 for a vehicle, the heat source circuit is the residential hot water circuit 2, through which hot water heated by a household heat source and stored in the tank 7 flows, and the connector comprises the vehicle side jack 3a, which is provided on the first branch pipes 301, 301' that bifurcate from the engine cooling water circulation circuit 1, and the residence side plug 3b, which is provided on the second branch pipes 302, 302' that bifurcate from the residential hot water circuit 2. Hence, an instantaneous engine warm-up effect can be obtained as soon as the user enters the vehicle such that the vehicle cabin can be heated by the heater core 5 from the initial stage of engine warm-up, and an improvement in fuel economy can be achieved.

(3) The connector is constituted by the one-touch connector 3, which connects the first branch pipes 301, 301' to the second branch pipes 302, 302' by connecting the vehicle side jack 3a to the residence side plug 3b, and disconnects the first branch pipes 301, 301' and the second branch pipes 302, 302' by disconnecting the vehicle side jack 3a from the residence side plug 3b. Therefore, operations to connect and disconnect the branch pipes are not required, and as a result, the operating load of the connection operation and disconnection operation on the user can be lightened.

(4) The vehicle side jack 3a of the one-touch connector 3 comprises the open-close lid 11, which is provided on the periphery of the vehicle fender, and is opened when the residence side plug 3b is connected and closed after the residence side plug 3b has been disconnected. Hence, the vehicle side jack 3a is positioned close to the engine cooling water circulation circuit 1 such that the first branch pipes 301, 301' can be shortened, which is advantageous in terms of layout, and moreover, the one-touch connector 3 can be made inconspicuous, which is advantageous in terms of outward appearance.

(5) An identical medium flows through the engine cooling water circulation circuit 1 and the residential hot water circuit 2, and the residential hot water circuit 2 comprises: the hot water circulation switch valve 8, which switches the hot water to the vehicle circulation side when heat is to be transferred; and the circulation pump 9, which circulates the hot water through the residential hot water circuit 2 and the engine cooling water circulation circuit 1. Hence, only the first branch pipes 301, 301' and the connector structure are required as additional vehicle side constitutions, enabling structural simplicity. Furthermore, the hot water stored in the residential hot water circuit 2 is circulated to the engine cooling water circulation circuit 1 as is, and therefore the engine can be warmed up effectively in a short time period.

(6) The connector connection switch 19 that detects whether or not the one-touch connector 3 is in a connected state, the timer setting dial 15 that sets the warm-up start time, and a plug-in warm-up control mechanism (FIG. 5) that switches the hot water circulation switch valve 8 to the hot water circulation side and drives the circulation pump 9 to circulate the hot water between the residential hot water circuit 2 and the engine cooling water circulation circuit 1 when the connector is detected to be in the connected state and the warm-up start time set by the timer setting dial 15 arrives after the auto switch 14 has been switched ON are also provided, and therefore the operation timing of the warm-up system can be controlled by a timer function such that warm-up ends before engine start-up begins.

(7) In a warm-up method for an in-vehicle power train, which pre-warms up of the in-vehicle power train by transferring heat from a heat source to a vehicle side warm-up circuit, a residence side heat source circuit employing a household heat source is provided as a heat source, and a connector is provided in the vehicle side warm-up circuit and the residence side heat source circuit so as to be capable of connecting and disconnecting the two circuits. The warm-up method comprises: a circuit connection procedure for connecting the vehicle side warm-up circuit and the residence side heat source circuit by connecting the connector prior to start-up of the in-vehicle power train; a household thermal energy transfer procedure for transferring heat from the residence side heat source circuit to the vehicle side warm-up circuit when the two circuits are in a connected state; and a circuit disconnection procedure for disconnecting the vehicle side warm-up circuit and the residence side heat source circuit by disconnecting the connector after heat has been transferred to the vehicle side warm-up circuit side. Hence, pre-warm up can be done at low weight/low cost, without the need to add complicated components and control, and an instantaneous warm-up effect can be obtained as soon as the user enters the vehicle.

Second Embodiment

In consideration of the use of household thermal energy to pre-warm up, the second embodiment is an example in which the temperature of the engine cooling water is raised via a heat exchanger, rather than circulating household hot water directly to the vehicle as in the first embodiment.

Figure 6:
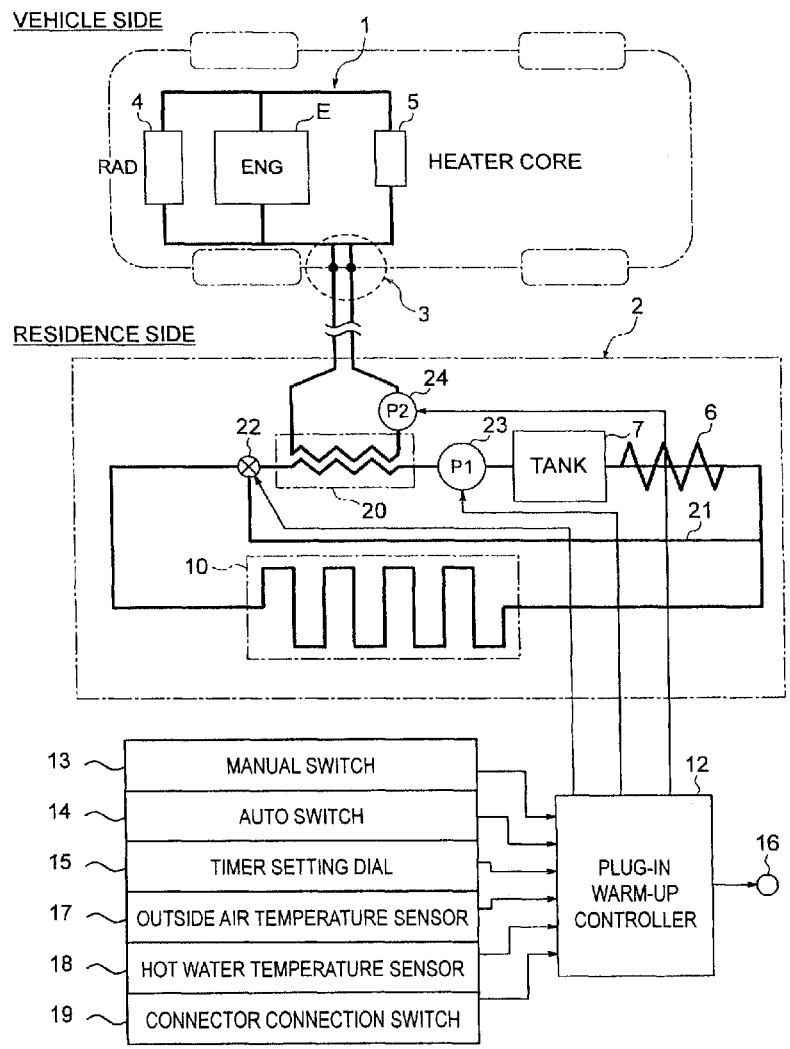
FIG. 6 is an illustrative view showing an engine warm-up system according to a second embodiment.

First, the constitution of the second embodiment will be described. FIG. 6 is an illustrative view of a warm-up system for an engine (serving as an example of an in-vehicle power train) according to the second embodiment.

As shown in FIG. 6, the engine warm-up system according to the second embodiment pre-warms up of an engine E by transferring heat from a heat source to an engine cooling water circulation circuit 1 (vehicle side warm-up circuit) of the vehicle. A residential hot water circuit 2 (heat source circuit) using a household heat source is provided as the heat source. The engine cooling water circulation circuit 1 and the residential hot water circuit 2 include a one-touch connector 3 (connector) that connects the two circuits 1, 2 prior to start-up of the engine E such that heat is transferred to the engine cooling water circulation circuit 1, and disconnects the two circuits 1, 2 following heat transfer.

As shown in FIG. 6, the residential hot water circuit 2 is a circuit through which household floor heating hot water, which is heated by a heater 6 using nighttime electricity, gas, or the like and stored in a tank 7, circulates. Purified water, which is different to the engine cooling water (LLC) used in the engine cooling water circulation circuit 1, is used as a medium. In other words, the engine cooling water circulation circuit 1 and the residential hot water circuit 2 employ different media.

As shown in FIG. 6, the residential hot water circuit 2 comprises a warm-up heat exchanger 20 that performs heat exchange between the engine cooling water and the residential heating hot water during heat transfer, a heat exchange switch valve 22 that switches between a side on which the hot water flows only to a floor heating heat exchanger 10 (heating heat exchanger) and a side (a bypass circuit 21 side) on which the hot water flows to the warm-up heat exchanger 20, a residence side circulation pump 23 that circulates the hot water through the residential hot water circuit 2, and a vehicle side circulation pump 24 that circulates the engine cooling water through the engine cooling water circulation circuit 1. Further, as shown in FIG. 6, the residential hot water circuit 2 comprises the floor heating heat exchanger 10, which circulates hot water by switching the heat exchange switch valve 22 to the side on which the hot water flows only to the residential hot water circuit 2 and driving the residence side circulation pump 23, and performs floor heating by introducing the hot water stored in the tank 7 into the residential hot water circuit 2.

As shown in FIG. 6, a plug-in warm-up control system includes a plug-in warm-up controller 12 serving as a calculation processing circuit. The plug-in warm-up controller 12 includes an operation panel. The operation panel comprises a manual switch 13, an auto switch 14 (automatic warm-up switch), a timer setting dial 15 (timer setting mechanism), and an operation lamp 16.

Further, sensor signals and switch signals are input into the plug-in warm-up controller 12 from an outside air temperature sensor 17, a hot water temperature sensor 18, a connector connection switch 19 (connector connection detection mechanism), and so on. Further, the plug-in warm-up controller 12 outputs control commands to the heat exchange switch valve 22, the residence side circulation pump 23, and the vehicle side circulation pump 24. It should be noted that the constitutions of the engine cooling water circulation circuit 1, the one-touch connector 3, and so on are identical to those of the first embodiment, and therefore description thereof has been omitted.

Next, actions of this embodiment will be described. In the first embodiment described above, the engine cooling water circulation circuit 1 and residential hot water circuit 2 use identical media, and engine warm-up is performed by introducing household side hot water directly into the vehicle. In the second embodiment, on the other hand, the media of the engine cooling water circulation circuit 1 and the residential hot water circuit 2 are different. The second embodiment also differs from the first embodiment in that engine warm-up is performed by raising the temperature of the engine cooling water via the warm-up heat exchanger 20. Other actions are identical to their counterparts in the first embodiment, and therefore description thereof has been omitted.

Next, effects of this embodiment will be described. In addition to the effects of (1) and (7) in the first embodiment, the warm-up system and warm-up method according to the second embodiment achieve the following effects.

(8) Different media flow through the vehicle side warm-up circuit (the engine cooling water circulation circuit 1) and the residence side heat source circuit (the residential hot water circuit 2), respectively, and heat from the residence side heat source circuit (the residential hot water circuit 2) is transferred to the vehicle side warm-up circuit (the engine cooling water circulation circuit 1) via a heat exchanger (the warm-up heat exchanger 20). Hence, a residence side heat source employing hot water, high-temperature oil, high-temperature gas, and so on can be used effectively, regardless of the type of medium (long-life coolant or the like) used in the vehicle side warm-up circuit, and therefore vehicle side warm-up can be performed instantaneously.

(9) The vehicle side warm-up circuit is the engine cooling water circulation circuit 1 for a vehicle, the residence side heat source circuit is the residential hot water circuit 2, through which hot water stored in the tank 7, which is a different medium to the medium of the engine cooling water circulation circuit 1, flows, and the residential hot water circuit 2 comprises: the warm-up heat exchanger 20, which performs heat exchange between the engine cooling water and the residential hot water; the heat exchange switch valve 22, which switches to a side on which the hot water flows to the warm-up heat exchanger 20; the residence side circulation pump 23, which circulates the hot water through the residential hot water circuit 2; and the vehicle side circulation pump 24, which circulates the engine cooling water through the engine cooling water circulation circuit 1. Hence, only the first branch pipes 301, 301' and the connector structure are required as additional vehicle side constitutions, enabling structural simplicity. Furthermore, hot water used in a household for heating floors and so on can be used effectively to enable instantaneous engine warm-up.

Third Embodiment

Similarly to the second embodiment, the third embodiment is an example in which the temperature of the engine cooling water is raised via a heat exchanger, but here, the engine cooling water is warmed using household waste heat from a hot water supply, a bath, and so on instead of the floor heating heat source.

Figure 7:
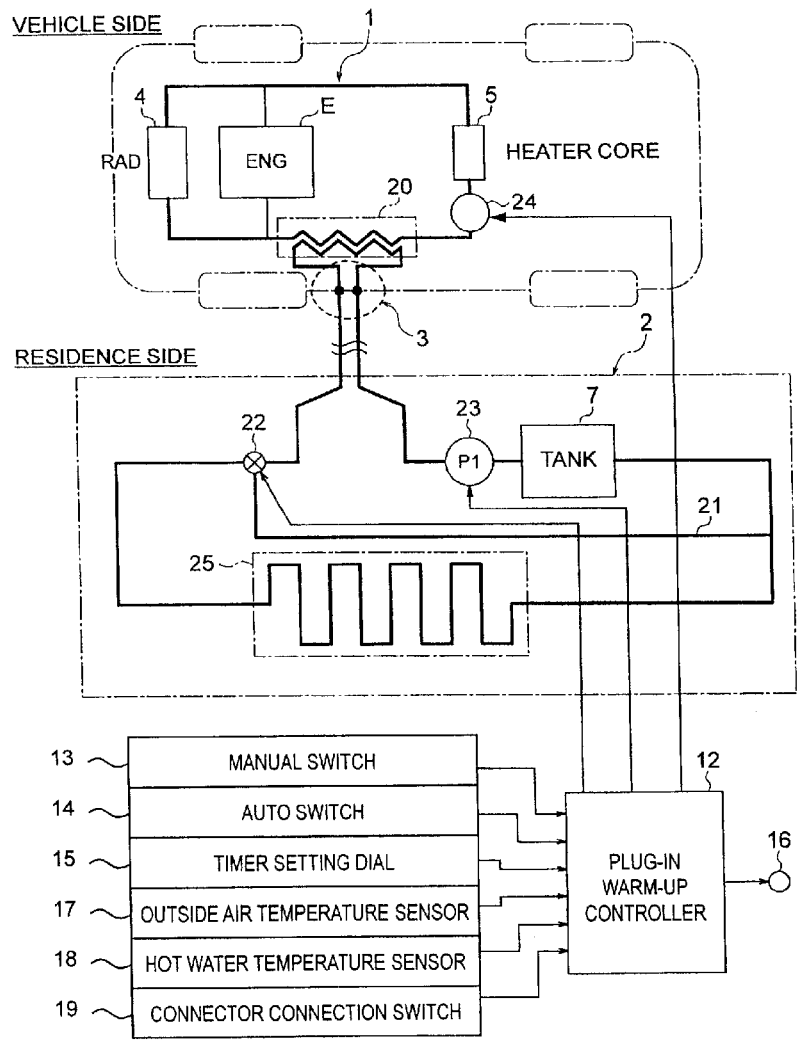
FIG. 7 is an illustrative view showing an engine warm-up system according to a third embodiment.

First, the constitution of this embodiment will be described. FIG. 7 is an illustrative view of a warm-up system for an engine (serving as an example of an in-vehicle power train) according to the third embodiment.

As shown in FIG. 7, the engine warm-up system according to the third embodiment pre-warms up of an engine E by transferring heat from a heat source to an engine cooling water circulation circuit 1 (vehicle side warm-up circuit) of the vehicle. A residential hot water circuit 2 (heat source circuit) using a household heat source is provided as the heat source. The engine cooling water circulation circuit 1 and the residential hot water circuit 2 include a one-touch connector 3 (connector) that connects the two circuits 1, 2 prior to start-up of the engine E such that heat is transferred to the engine cooling water circulation circuit 1, and disconnects the two circuits 1, 2 following heat transfer.

As shown in FIG. 7, the engine cooling water circulation circuit 1 is used to connect the engine E, a radiator 4, and a heater core 5 in parallel. Long life coolant (LLC) is used as the engine cooling water.

As shown in FIG. 7, a warm-up heat exchanger 20 that performs heat exchange between the engine cooling water and the residential hot water and a vehicle side circulation pump 24 that circulates the engine cooling water through the engine cooling water circulation circuit 1 during heat transfer are provided in positions near the connector 3 of the engine cooling water circulation circuit 1. It should be noted that either a pre-existing pump or a new pump may be provided on the engine cooling water circulation circuit 1 as the vehicle side circulation pump 24.

As shown in FIG. 7, the residential hot water circuit 2 is a circuit through which hot water, which is heated by the heat exchanger using household waste heat (a household heat source) from a bath, a hot water supply, circulates. The residential hot water circuit 2 uses purified water or the like, i.e. a different medium to the engine cooling water (LLC) of the engine cooling water circulation circuit 1. In other words, the engine cooling water circulation circuit 1 and the residential hot water circuit 2 employ different media.

As shown in FIG. 7, the residential hot water circuit 2 comprises a heat exchange switch valve 22 which is capable of switching to a side (bypass circuit 21 side) on which the hot water flows to the warm-up heat exchanger 20, and a residence side circulation pump 23 that circulates the hot water through the residential hot water circuit 2.

Further, as shown in FIG. 7, the residential hot water circuit 2 includes a waste heat recovery heat exchanger 25 that performs heat exchange with household waste heat by switching the heat exchange switch valve 22 to the residence side hot water circuit 2 and driving the residence side circulation pump 23 such that the hot water is circulated.

As shown in FIG. 7, a plug-in warm-up controller 12 (a plug-in warm-up control mechanism) serving as a calculation processing circuit is provided as a plug-in warm-up control system. The plug-in warm-up controller 12 includes an operation panel. The operation panel comprises a manual switch 13, an auto switch 14 (automatic warm-up switch), a timer setting dial 15 (timer setting mechanism), and an operation lamp 16.

Further, sensor signals and switch signals are input into the plug-in warm-up controller 12 from an outside air temperature sensor 17, a hot water temperature sensor 18, and a connector connection switch 19 (connector connection detection mechanism). Further, the plug-in warm-up controller 12 outputs control commands to the heat exchange switch valve 22, the residence side circulation pump 23, and the vehicle side circulation pump 24. When the connector 3 is connected, the vehicle side circulation pump 24 is driven during warm-up by supplying power from an external power source on the residence side. It should be noted that the constitutions of the one-touch connector 3 and so on are identical to those of the first embodiment, and therefore description thereof has been omitted.

Next, actions of this embodiment will be described. In the first embodiment, the engine cooling water circulation circuit 1 and residential hot water circuit 2 use identical media, and engine warm-up is performed by introducing household hot water directly into the vehicle. In the third embodiment, the engine cooling water circulation circuit 1 and residential hot water circuit 2 employ different media, and hot water is stored using household waste heat. This hot water is used to perform engine warm-up by raising the temperature of the engine cooling water through the warm-up heat exchanger 20. Other actions are identical to those of the first embodiment, and therefore description thereof has been omitted.

Next, effects of this embodiment will be described. In addition to the effect of (8) in the second embodiment, the warm-up system and warm-up method according to the third embodiment achieve the following effect.

(10) The vehicle side warm-up circuit is the engine cooling water circulation circuit 1 for a vehicle, the residence side heat source circuit is the residential hot water circuit 2, through which hot water stored in the tank 7, which is a different medium to the medium of the engine cooling water circulation circuit 1, flows, the engine cooling water circulation circuit 1 is provided with: the warm-up heat exchanger 20, which performs heat exchange between the engine cooling water and the residential hot water during heat transfer; and the vehicle side circulation pump 24, which circulates the engine cooling water through the engine cooling water circulation circuit 1, and the residential hot water circuit 2 is provided with: the heat exchange switch valve 22, which switches to a side on which the hot water flows to the warm-up heat exchanger 20 when heat is to be transferred; and the residence side circulation pump 23, which circulates the hot water through the residential hot water circuit 2. Hence, household waste heat from the bath, the hot water supply, and so on can be used effectively to enable instantaneous engine warm-up while achieving structural simplicity due to the fact that only the second branch pipes 302, 302' and the connector structure are required as additional residence side constitutions.

Fourth Embodiment

In consideration of the use of household thermal energy to pre-warm up, the fourth embodiment is an example in which a transportable heat exchanger using a commercial power source as an energy source is provided in place of a stationary system applied to a household including the floor heating heat exchanger 10, as in the first embodiment, and the temperature of the engine cooling water is raised using this transportable heat exchanger.

Figure 9:
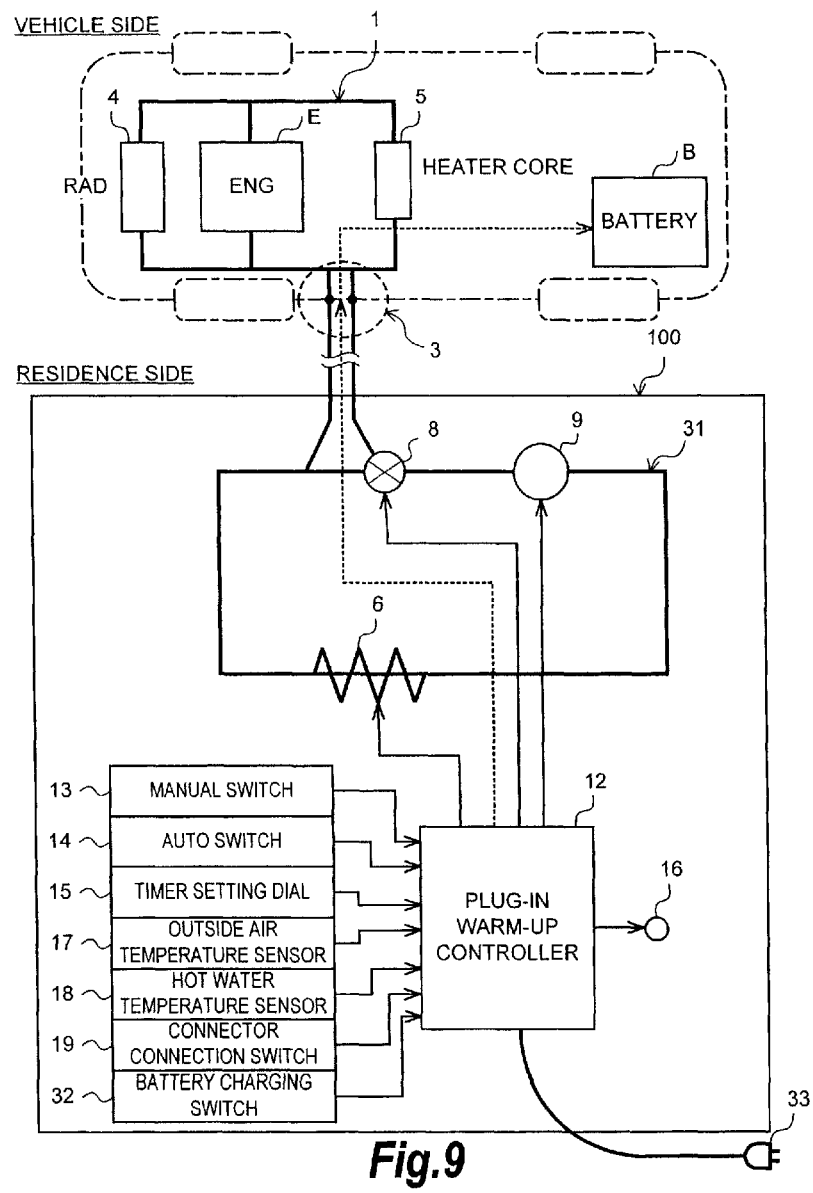
FIG. 9 is an illustrative view showing an engine warm-up system according to a fourth embodiment.

First, the constitution of this embodiment will be described. FIG. 9 is an overall system diagram showing a warm-up system for an engine (serving as an example of an in-vehicle power train) according to the fourth embodiment.

As shown in FIG. 9, the engine warm-up system according to the fourth embodiment pre-warms up of an engine E by transferring heat from a heat source to an engine cooling water circulation circuit 1 (vehicle side warm-up circuit) of the vehicle. A hot water circuit 31 (heat source circuit) is provided as a heat source. Further, similarly to the first through third embodiments described above, a one-touch connector 3 that connects the engine cooling water circulation circuit 1 and the hot water circuit 31 such that heat is transferred to the engine cooling water circulation circuit 1, and disconnects the two circuits 1, 2 following heat transfer, is provided between the two circuits 1, 2.

As shown in FIG. 9, the hot water circuit 31 is a circuit through which a medium, which is heated by a heater 6 (heat source) using a commercial power source and stored in a tank 7, circulates. Identical long life coolant (LLC) to the engine cooling water is employed as the medium. In other words, the engine cooling water circulation circuit 1 and the hot water circuit 31 use the same medium.

Further, as shown in FIG. 9, the hot water circuit 31 comprises a hot water circulation switch valve 8 that switches the hot water to the vehicle circulation side during heat transfer, and a circulation pump 9 that circulates the hot water through the residential hot water circuit 31 and the engine cooling water circulation circuit 1.

The hot water circuit 31 according to the fourth embodiment is provided in a hot water circuit device 100 serving as a transportable casing. The hot water circuit device 100 includes a power cable 33. An end portion of the power cable 33 takes the form of an insertion plug that is connected to an insertion plug receiver (a plug socket) of a commercial power line. The heater 6 heats the medium upon reception of a supply of power from the commercial power line.

Furthermore, in the fourth embodiment, the one-touch connector 3 is provided with contacts for supplying power from the power cable 33 to the vehicle. More specifically, both a vehicle side jack 3a and a residence side plug 3b are provided with a conductive metal contact in a part where the two come into contact. The metal contacts are provided with a biasing mechanism such as a spring that biases against each other so as to increase the contact pressure, leading to an increase in conductivity, is provided. The commercial power supplied via the power cable 33 is led to the vehicle through these contacts, and a battery B installed in the vehicle is charged by the power of the commercial power source. Depending on the type of the installed battery B, functions for controlling charging of the battery B (for example, monitoring the battery voltage, alternating current/direct current conversion, increasing and decreasing the voltage, and starting/terminating charging) may be provided in the plug-in warm-up controller 12.

The plug-in warm-up controller 12 also includes a charging switch 32. When the user operates the charging switch 32 after connecting the one-touch connector 3, the battery B is charged with power from the commercial power source.

The plug-in warm-up controller 12 may also measure the voltage, SOC, and so on of the battery B when the one-touch connector 3 is connected, and control starting/terminating charging of the battery B autonomously on the basis of the measurement result.

With this constitution, the battery B installed in the vehicle can be charged at the same time as the vehicle is warmed up while parked at night or the like, as described above.

As shown in FIG. 9, the plug-in warm-up controller 12 (plug-in warm-up control mechanism), which serves as a calculation processing circuit, is provided as a plug-in warm-up control system. An operation panel of the plug-in warm-up controller 12 comprises a manual switch 13, an auto switch 14 (automatic warm-up switch), a timer setting dial 15 (timer setting mechanism), an operation lamp 16, and the charging switch 32.

Further, sensor signals and switch signals are input into the plug-in warm-up controller 12 from an outside air temperature sensor 17, a hot water temperature sensor 18, a connector connection switch 19 (connector connection detection mechanism), and so on. Further, the plug-in warm-up controller 12 outputs control commands to the hot water circulation switch valve 8 and the circulation pump 9. It should be noted that the constitutions of the engine cooling water circulation circuit 1, the one-touch connector 3, and so on are identical to those of the first embodiment, and therefore description thereof has been omitted.

Next, actions of this embodiment will be described. In the fourth embodiment, similarly to the first embodiment, the engine cooling water circulation circuit 1 and the hot water circuit 31 employ identical media, and engine warm-up is performed by circulating the medium, which is heated by the heater 6, through the vehicle. Other actions are identical to those of the first embodiment, and therefore description thereof has been omitted.

The heater 6 (heat source) of the fourth embodiment may use household waste heat or non-household waste heat. For example, waste heat from an outdoor illumination device, a vendor (a vending machine), and so on may be used as the heat source.

Next, effects of this embodiment will be described. In addition to the effect of (1) in the first embodiment, the following effects can be obtained with the warm-up system and warm-up method according to the fourth embodiment.

(11) The vehicle side warm-up circuit is the engine cooling water circulation circuit 1 for a vehicle, the heat source circuit is the hot water circuit 31, which circulates heat generated by electric power supplied by the power cable 33 that can be connected to and disconnected from a commercial power source, and the hot water circuit 31 is provided in a transportable casing (the hot water circuit device 100). Hence, there is no need to add a new fixed facility to the residence side, and the cost of providing the hot water circuit device 100 serving as the hot water circuit can be reduced. Further, the hot water circuit device 100 does not necessarily have to be disposed in a residence or a parking space or the like annexed to the residence, and as long as a commercial power source can be secured, the hot water circuit device 100 can be disposed in a parking space or the like removed from the residence. Accordingly, the degree of freedom in the disposal location increases. Thus, a warm-up effect can be obtained instantaneously and at low cost under various conditions when the user enters the vehicle.

(12) The battery B is installed in the vehicle, the vehicle side warm-up circuit is the engine cooling water circulation circuit 1 for a vehicle, the heat source circuit comprises the power cable 33 that can be connected to and disconnected from a commercial power source, and the connector 3 charges the battery B using electric power supplied by the power cable 33 while the vehicle side warm-up circuit is connected to the heat source circuit. Hence, the battery B installed in the vehicle can be charged at the same time as the vehicle is warmed up overnight or the like in a parking space, as described above.

It should be noted that superheating of the heater 6, charging of the battery B, and so on may be performed urgently using a battery device provided in the hot water circuit device 100 instead of a commercial power source.

Fifth Embodiment

In consideration of the use of household thermal energy, the fifth embodiment is an example that comprises a transportable heat exchanger using a commercial power source as an energy source, similarly to the fourth embodiment, and moreover, in this example the temperature of the engine cooling water is raised via a heat exchanger instead of introducing household hot water directly into the vehicle.

Figure 10:
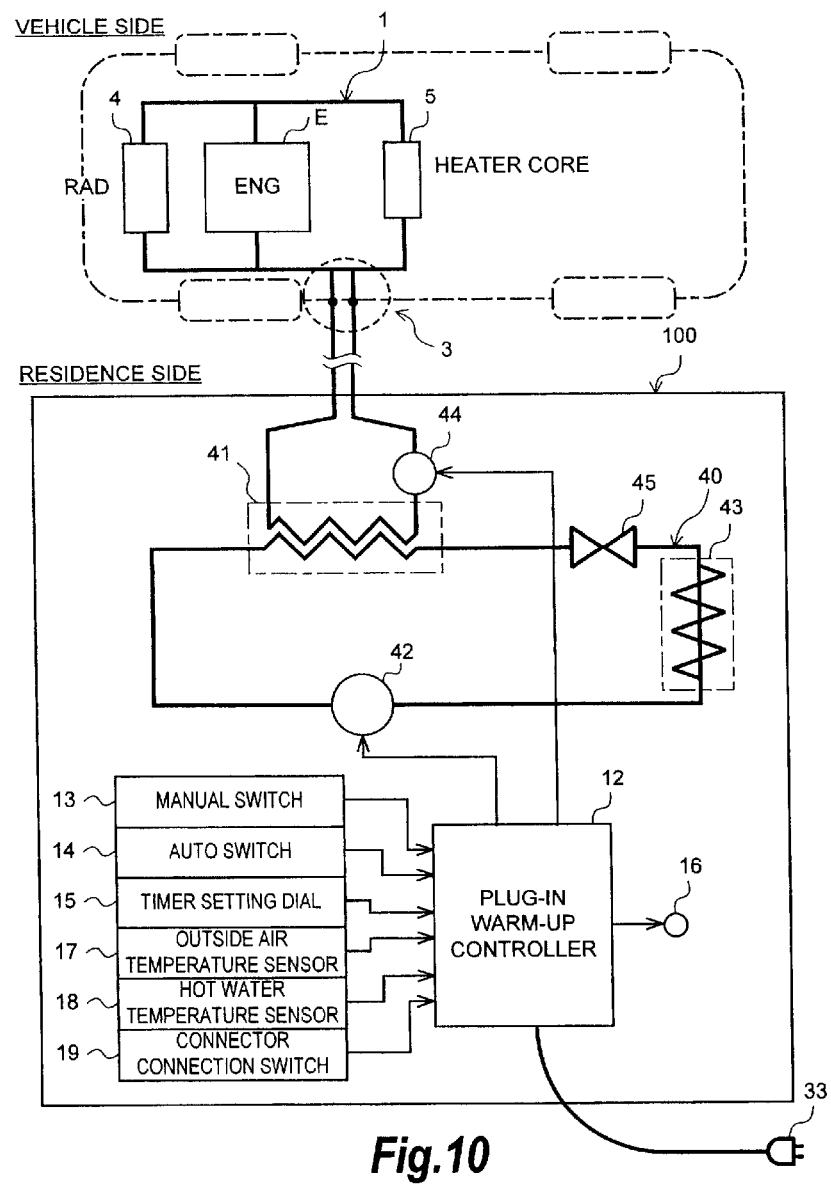
FIG. 10 is an illustrative view showing an engine warm-up system according to a fifth embodiment.

First, the constitution of this embodiment will be described. FIG. 10 is an overall system diagram showing a warm-up system for an engine (serving as an example of an in-vehicle power train) according to the fifth embodiment.

As shown in FIG. 10, the engine warm-up system according to the fifth embodiment comprises a hot water circuit 31 that serves as a heat source for pre-warm up of an engine E by transferring heat from the heat source to an engine cooling water circulation circuit 1 (vehicle side warm-up circuit). Further, similarly to the first through third embodiments described above, a one-touch connector 3 that connects the engine cooling water circulation circuit 1 and the hot water circuit 31 such that heat is transferred to the engine cooling water circulation circuit 1, and disconnects the two circuits 1, 2 following heat transfer, is provided between the two circuits 1, 2.

As shown in FIG. 10, the hot water circuit 31 is constituted by a heat pump 40 serving as a heat cycle system formed from a compressor 42 that pumps a medium, an expansion valve 45 that expands the medium, and an external heat exchanger 43 (evaporator). The compressor 42 operates using nighttime electricity or the like. HFC 134a, carbon dioxide, or similar, for example, is used as the medium.

As shown in FIG. 10, the hot water circuit 31 includes a warm-up heat exchanger 41 (condenser) that performs heat exchange between the engine cooling water and the medium during heat transfer, and a vehicle side circulation pump 44 that circulates the engine cooling water through the engine cooling water circulation circuit 1.

The hot water circuit 31 according to the fifth embodiment is provided in a hot water circuit device 100 serving as a transportable casing. The hot water circuit device 100 includes a power cable 33. An end portion of the power cable 33 takes the form of an insertion plug that is connected to an insertion plug receiver (a plug socket) of a commercial power line. The compressor 42 compresses the medium upon reception of a supply of power from the commercial power source, and circulates the compressed, heated medium. Similarly, the vehicle side circulation pump 44 circulates the medium upon reception of a supply of power from the commercial power source.

As shown in FIG. 10, a plug-in warm-up controller 12 (a plug-in warm-up control mechanism) serving as a calculation processing circuit is provided as a plug-in warm-up control system. An operation panel of the plug-in warm-up controller 12 comprises a manual switch 13, an auto switch 14 (automatic warm-up switch), a timer setting dial 15 (timer setting mechanism), and an operation lamp 16.

Further, sensor signals and switch signals are input into the plug-in warm-up controller 12 from an outside air temperature sensor 17, a hot water temperature sensor 18, and a connector connection switch 19 (connector connection detection mechanism), and so on. The plug-in warm-up controller 12 also outputs control commands to the compressor 42 and the vehicle side circulation pump 44. It should be noted that the constitutions of the engine cooling water circulation circuit 1, the one-touch connector 3, and so on are identical to those of the first embodiment, and therefore description thereof has been omitted.

Next, actions of this embodiment will be described. In the fourth embodiment described above, the engine cooling water circulation circuit 1 and the hot water circuit 31 employ identical media, and engine warm-up is performed by circulating hot water directly through the vehicle. In the fifth embodiment, on the other hand, the engine cooling water circulation circuit 1 and the heat pump 40 employ different media, and engine warm-up is performed by raising the temperature of the engine cooling water via the warm-up heat exchanger 41. Other actions are similar to those of the fourth embodiment, and therefore description thereof has been omitted.

Next, effects of this embodiment will be described. In addition to the effect of (1) in the first embodiment, the following effect can be obtained with the warm-up system and warm-up method according to the fifth embodiment.

(13) The vehicle side warm-up circuit is the engine cooling water circulation circuit 1 for a vehicle, the heat source circuit is the hot water circuit 31 employing the heat pump 40, which pumps the medium using the compressor 42 operated by electric power supplied by the power cable 33 that can be connected to and disconnected from a commercial power source, and expands the medium using the expansion valve 45. The hot water circuit 31 is provided in a transportable casing (the hot water circuit device 100), and the engine cooling water circulation circuit 1 comprises the warm-up heat exchanger 41, which performs heat exchange between the engine cooling water and the medium, and the vehicle side circulation pump 44, which circulates the engine cooling water through the engine cooling water circulation circuit 1. Hence, there is no need to add new facilities to the residence side, and therefore the cost of disposing the heat source circuit can be suppressed. Furthermore, the heat source circuit does not necessarily have to be disposed in a residence, and as long as a power source can be secured, the heat source circuit may be disposed in a parking space or the like removed from the residence, for example. Accordingly, the degree of freedom in the disposal location increases. Further, a heat pump is employed as the heat source circuit, and therefore a low-cost, highly efficient heat source can be provided such that a warm-up effect can be obtained instantaneously and at low cost under various conditions when the user enters the vehicle.

Sixth Embodiment

The sixth embodiment is an example in which a plug-in hybrid vehicle that is capable of charging a battery using a commercial power source is provided with a one-touch connector, and the connector is used for both hot water connection and charging connection.

Figure 11:
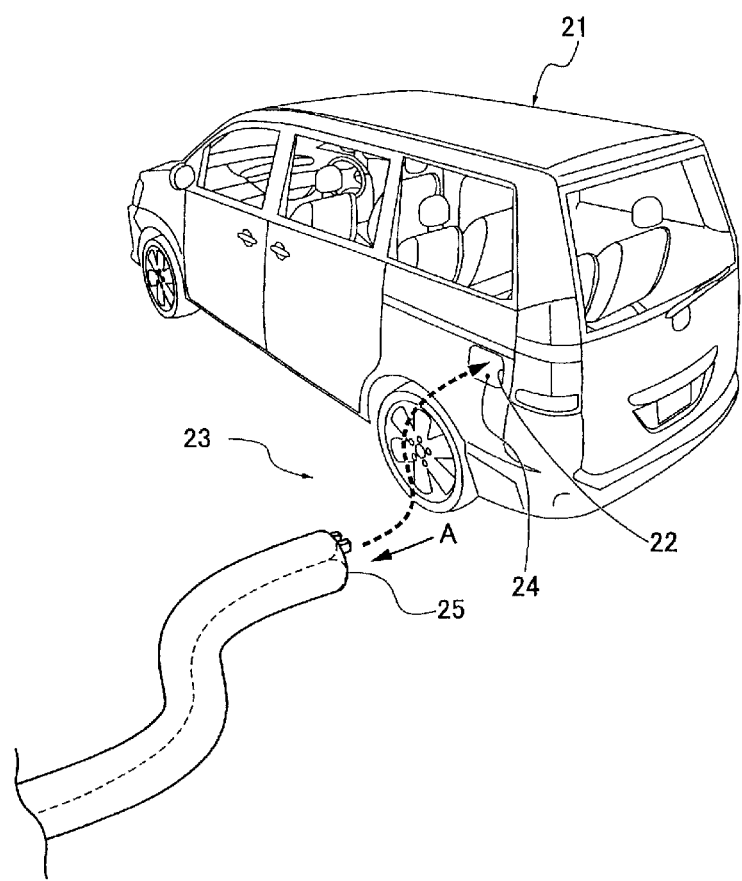
FIG. 11 is an illustrative view showing an engine warm-up system according to a sixth embodiment.
Figure 12:
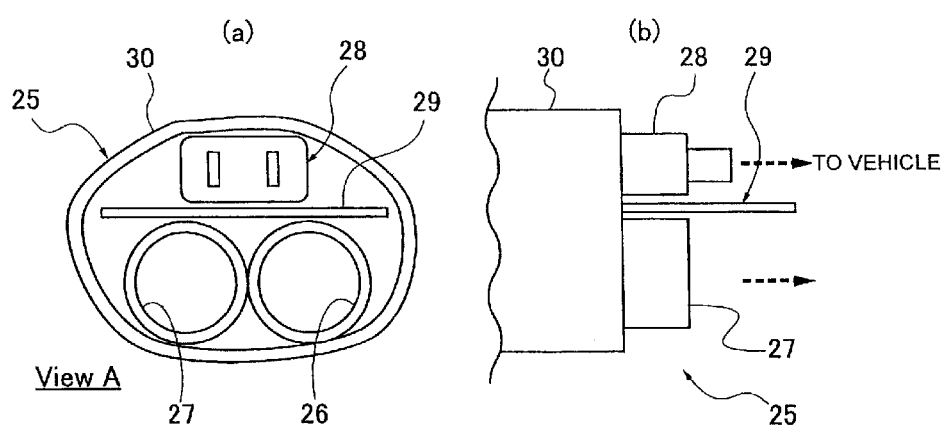
FIG. 12A is an illustrative view showing a residence side connector of the engine warm-up system according to the sixth embodiment.
FIG. 12B is an illustrative view showing a residence side connector of the engine warm-up system according to the sixth embodiment.

First, the constitution of this embodiment will be described. FIG. 11 is an overall perspective view showing a plug-in hybrid vehicle to which the warm-up system for an engine (serving as an example of an in-vehicle power train) according to the sixth embodiment is applied. FIG. 12A and FIG. 12B are views showing a residence side connector of the plug-in hybrid vehicle to which the engine warm-up system according to the sixth embodiment is applied, FIG. 12A showing the residence side connector in the direction of an arrow A in FIG. 11, and FIG. 12B showing a side view of the residence side connector.

As shown in FIG. 11, a plug-in hybrid vehicle 21 includes a charging connection mechanism 22 that charges an in-vehicle battery from a commercial power source. Further, similarly to the first embodiment, a vehicle side warm-up circuit of the plug-in hybrid vehicle 21 serves as an engine cooling water circulation circuit, while a heat source circuit serves as a residential hot water circuit through which hot water heated by a household heat source and stored in a tank is caused to flow, similarly to the first embodiment.

As shown in FIG. 11, a one touch connector 23 of the sixth embodiment comprises a vehicle side connector 24 provided in a position of the charging connection mechanism 22, and a residence side connector 25 provided on an end portion of a branch pipe extending from the residential hot water circuit. By means of a single connection operation, a hot water connection (warm-up heat connection) is achieved between the engine cooling water circulation circuit and the residential hot water circuit, and at the same time, a charging connection is achieved.

A hot water inflow pipe and a hot water outflow pipe, which constitute a vehicle side jack provided in an end portion position of a first branch pipe that bifurcates from the engine cooling water circulation circuit, and a charging socket provided in a position of the vehicle side jack, are gathered together in the vehicle side connector 24. Although not shown in the drawings, the vehicle side connector 24 forms a pair with the residence side connector 25.

As shown in FIG. 12A, a hot water inflow pipe 26 and a hot water outflow pipe 27, which constitute a residence side plug provided in an end portion position of a second branch pipe that bifurcates from the residential hot water circuit, and a charging plug 28 provided in a position of the residence side plug, are gathered together in the residence side connector 25.

As shown in FIGS. 12A and 12B, the charging plug 28 is disposed on an upper side of the residence side connector 25, while the hot water inflow pipe 26 and the hot water outflow pipe 27 are disposed on a lower side of the charging plug 28. A partition plate 29 that projects from an end surface of the connection member in an axial direction of the connector is provided between the charging plug 28 and the hot water inflow pipe 26 and hot water outflow pipe 27.

The entire residence side connector 25, including at least an end portion outer peripheral position that is gripped by an operator, surrounds the hot water inflow pipe 26, hot water outflow pipe 27, charging plug 28, and partition plate 29, and is covered by an electrical insulation layer 30 having a flexible hose structure. Further, in the residence side connector 25, a breaker, not shown in the drawing, that interrupts electrification of the charging plug 28 during an electrical leak is provided in a midway position of a charging power source circuit extending from the commercial power source to the charging plug 28.

The one-touch connection structure of the hot water inflow pipe 26 and the hot water outflow pipe 27 in the one-touch connector 23 of the sixth embodiment and other system constitutions are similar to their counterparts in the first embodiment, and therefore illustration and description thereof have been omitted.

Figure 13:
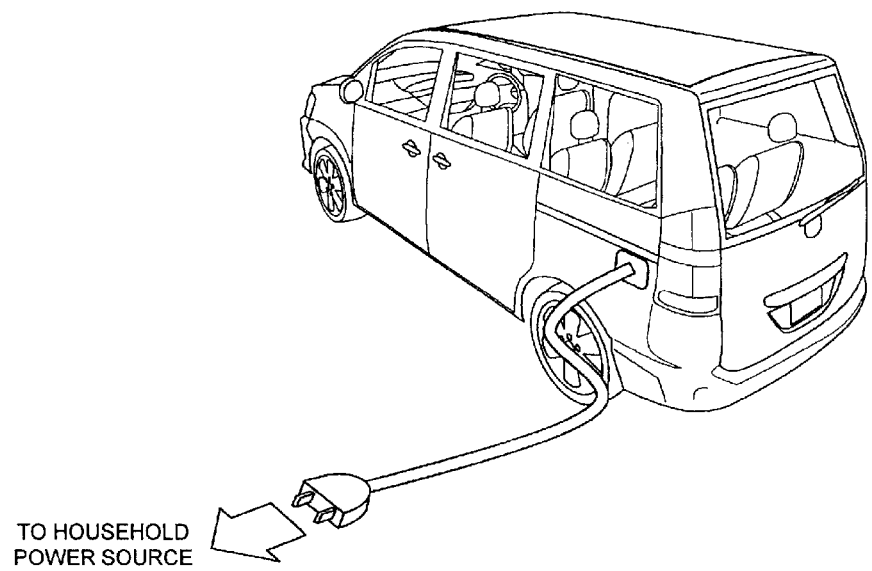
FIG. 13 is an illustrative view showing a conventional plug-in hybrid vehicle.

Next, actions of this embodiment will be described. As shown in FIG. 13, in a plug-in hybrid vehicle having a battery that can be charged using the commercial power source, the distance that can be traveled in an electric automobile mode using a motor is lengthened by increasing the capacity of the battery above that of a typical hybrid vehicle. Long-distance travel, high-speed travel, and so on are performed in a hybrid vehicle mode using the engine and the motor.

Greater effects in terms of CO2 reduction and atmospheric pollution prevention can be expected of a plug-in hybrid vehicle than a typical hybrid vehicle during to an increase in the proportion with which electricity is used as an energy source. If charging is performed using cheaper nighttime power, a reduction in fuel costs can be obtained, which is advantageous for the user.

If a charging connector and a warm-up connector are provided independently in a case where the warm-up system of this invention is applied to a plug-in hybrid vehicle, open-close lids must be provided in two locations covering the connectors on the vehicle side. Moreover, a plug-in warm-up operation and a plug-in battery charge operation must be performed separately. As a result, the operation load on the user increases.

Hence, in the sixth embodiment, a single connection operation in which the residence side connector 25 is inserted into the single-location vehicle side connector 24 constituting the one-touch connector 23 is sufficient to connect the engine cooling water circulation circuit to the residential hot water circuit and connect the charging circuit at the same time.

Therefore, a charging connection can be achieved incidentally while connecting the engine cooling water circulation circuit to the residential hot water circuit, and a hot water connection can be achieved incidentally during the connection operation for achieving the charging connection. Thus, the need to perform a plug-in warm-up operation and a plug-in battery charge operation separately is eliminated, and therefore the operation load on the user can be lightened. When only the plug-in warm-up operation is to be performed, electrification of the charging plug 28 is interrupted by a manual switch operation. Further, when only the plug-in battery charge operation is to be performed, a hot water circuit switch valve is switched to a side for halting the hot water supply. Other actions are similar to those of the first embodiment, and therefore description thereof has been omitted.

Next, effects of this embodiment will be described. In addition to the effects of (1) and (2) in the first embodiment, the following effects can be obtained with the warm-up system according to the sixth embodiment.

(14) The vehicle is the plug-in hybrid vehicle 21 having a charging connection mechanism for charging the battery installed in the vehicle using the commercial power source, and the one-touch connector 23 is capable of connecting the vehicle side warm-up circuit to the heat source circuit and connecting the charging circuit in a single connection operation. Hence, a plug-in warm-up operation and a plug-in battery charge operation can be performed by a single operation, and as a result, the operation load on the user of the plug-in hybrid vehicle 21 can be lightened.

(15) The vehicle side warm-up circuit is an engine cooling water circulation circuit of a vehicle, the residence side heat source circuit is a residential hot water circuit through which hot water stored in a tank flows, a first branch pipe bifurcating from the engine cooling water circulation circuit comprises a vehicle side jack on an end portion thereof and a charging socket in a position of the vehicle side jack, a second branch pipe bifurcating from the residential hot water circuit comprises a residence side plug on an end portion thereof and the charging plug 28 in a position of the residence side plug, and the one-touch connector 23 comprises the vehicle side connector 24, in which a hot water inflow pipe, a hot water outflow pipe, and the charging socket, which together constitute the vehicle side jack, are gathered, and the residence side connector 25, in which the hot water inflow pipe 26, the hot water outflow pipe 27, and the charging plug 28, which together constitute the residence side plug, are gathered. Hence, instantaneous engine warm-up and battery charging for extending the travel distance in a motor travel mode can be achieved by a single operation to connect the residence side connector 25 to the vehicle side connector 24.

(16) In the residence side connector 25, the charging plug 28 is disposed on an upper side, and the hot water inflow pipe 26 and hot water outflow pipe 27 are disposed on a lower side of the charging plug 28. Therefore, even when water leaks from the hot water inflow pipe 26 or the hot water outflow pipe 27, the water does not flow into the charging plug 28, and as a result, electrical leaks can be forestalled.

(17) The residence side connector 25 comprises the partition plate 29 that projects from an end surface of the connection member in an axial direction of the connector between the charging plug 28 and the hot water inflow pipe 26 and hot water outflow pipe 27. Therefore, even when hot water attempts to spurt from the hot water inflow pipe 26 or the hot water outflow pipe 27 toward the charging plug 28 side, the hot water is stopped by the partition plate 29, and as a result, hot water can be reliably prevented from spurting toward the charging plug 28 side.

(18) In the residence side connector 25, at least the vicinity of an outer periphery that is gripped by an operator is covered in the electrical insulation layer 30, and therefore, when an electrical leak occurs, for example, the user can be protected by the electrical insulation.

(19) The residence side connector 25 comprises a breaker that interrupts electrification of the charging plug 28 during an electrical leak in a midway position of a charging power source circuit extending from the commercial power source to the charging plug 28. Hence, electrification is interrupted when an electrical leak occurs, for example, and therefore the user can be protected. In other words, a two-fold protection measure is implemented in relation to electrical leaks.

The warm-up system and warm-up method according to this invention was described above on the basis of the first through sixth embodiments, but the specific constitution thereof is not limited to these embodiments, and design modifications and additions to the warm-up system, modifications and additions to the warm-up method, and so on are permitted as long as such modifications and additions do not depart from the spirit of the inventions relating to the scope of the claims.

In the first through sixth embodiments, an engine cooling water circulation circuit of a vehicle was cited as a vehicle side warm-up circuit, and a hot water circuit through which a medium such as a medium that circulates heat from a heat source flows was cited as a heat source circuit. However, a transmission oil circuit, a motor cooling water circulation circuit, and so on may be used as the vehicle side warm-up circuit. Further, a circuit that includes a heating heat exchanger or a waste heat recovery heat exchanger and uses a medium such as high-temperature oil or high-temperature gas may be used as the heat source circuit rather than a circuit that uses hot water as a medium. Examples of usable household heat sources include household waste heat from the bath or the hot water supply, a residential air-conditioning device, a condenser of a refrigerator, and smoke emissions from a hot water supply device.

In the first through sixth embodiments, an example of a one-touch connector that connects and disconnects branch pipes through simple connection and disconnection operations was illustrated. However, the connector may be provided with only a connection/disconnection function such that connection and disconnection of the two branch pipes and so on are performed using a separately provided electromagnetic valve or the like.

Figure 8:
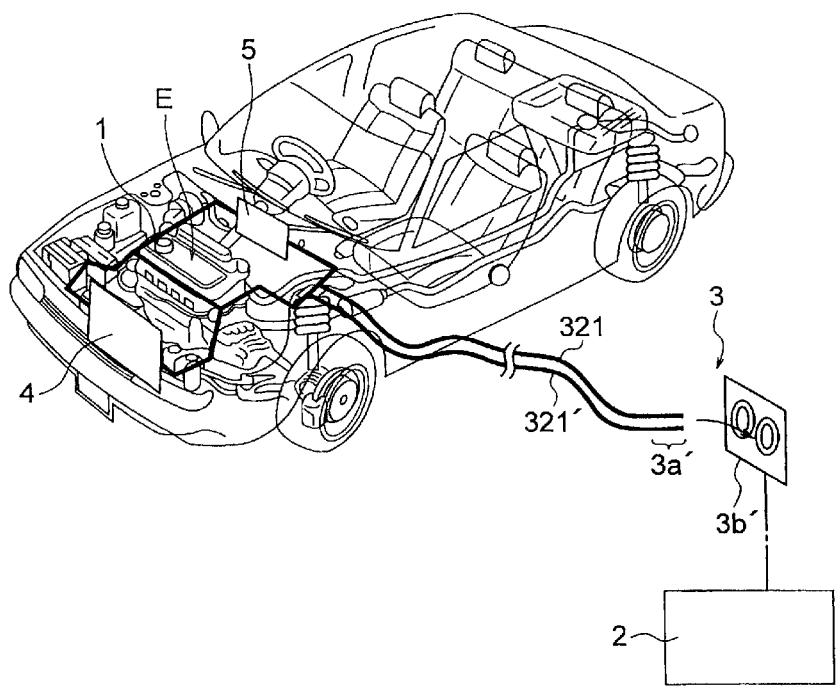
FIG. 8 is an illustrative view of a vehicle comprising an engine warm-up system according to another embodiment.

Further, as shown in FIG. 8, a constitution in which first branch pipes 321, 321' are extended to form freely flexible pipes, end portions of the first branch pipes 321, 321' form a vehicle side plug 3a', and a residence side connection port forms a residence side jack 3b' may be employed. In this case, the one-touch connector 3 is constituted by the vehicle side plug 3a' and the residence side jack 3b', and warm-up is performed by a plug-in operation from the vehicle side.

In short, as long as this invention comprises a heat source circuit that circulates heat from a heat source, and the vehicle side warm-up circuit and heat source circuit comprise a connector that connects the two circuits prior to start-up of an in-vehicle power train such that heat is transferred to the vehicle side warm-up circuit and disconnects the two circuits following heat transfer, the invention is not limited to the first through sixth embodiments.

Further, in the first to third and fifth embodiments, similarly to theسixth embodiment, the one-touch connector 3 may be provided with a contact for supplying power from the power cable 33 to the vehicle, and the one-touch connector 3 may be constituted to charge the battery B installed in the vehicle. With this constitution, charging of the battery installed in the vehicle can be completed at the same time as the vehicle is warmed up overnight when parked in a parking space or the like, as in the fourth embodiment described above. Therefore, when cheap power such as nighttime power is used in a so-called plug-in hybrid vehicle, for example, subsequent start-up of the vehicle can be performed with the battery fully charged, and as a result, an improvement in fuel economy can be achieved.

Further, in the first through third embodiments, the heat pump 40 disposed in a residence may be used as the heat source circuit, similarly to the fifth embodiment described above. In other words, a fixed heat pump system used in a residential heating and cooling facility or a hot water supply facility may be employed as the household side heat source.

In the first to fifth embodiments, examples in which this invention is applied to a warm-up system and a warm-up method for an engine were described, but the invention may also be applied to a warm-up system and warm-up method for performing transmission warm-up using heated transmission oil, motor warm-up using heated motor cooling water, and so on instead of engine warm-up. In other words, this invention may be applied to any warm-up system or warm-up method that pre-warms up of an in-vehicle power train by transferring heat from a heat source to a vehicle side warm-up circuit.

The entire contents of Japanese Patent Application P2007-241006 (filed Sep. 18, 2007), P2007-254946 (filed Sep. 28, 2007), and P2008-151881 (filed Jun. 10, 2008) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A warm-up system for a vehicle that pre-heats a vehicle power train by transferring heat from a heat source to an engine cooling water circulation circuit, comprising:
    a heat source circuit that circulates heat from a medium in a household heat source; and
    a connector that:
        connects the engine cooling water circulation circuit and the heat source circuit prior to start-up of the vehicle power train such that heat from the heat source circuit is transferred to the engine cooling water circulation circuit, and
        disconnects the engine cooling water circulation circuit and the heat source circuit after the heat is transferred to the engine cooling water circulation circuit,
    wherein the connector includes:
        a vehicle side jack on a first branch pipe that bifurcates from the engine cooling water circulation circuit, and
        a residence side plug on a second branch pipe that bifurcates from a residential hot water circuit,
    wherein the heat source circuit transfers heat through the connector as a flow of the medium to the engine cooling water circulation circuit.

2. The warm-up system of claim 1, wherein the heat source circuit comprises the residential hot water circuit through which hot water, heated by the household heat source and stored in a tank, flows.

3. The warm-up system of claim 2, wherein the connector comprises a one-touch connector that:
    connects the first branch pipe to the second branch pipe by connecting the vehicle side jack to the residence side plug, and
    disconnects the first branch pipe from the second branch pipe by disconnecting the vehicle side jack from the residence side plug.

4. The warm-up system of claim 3, wherein the vehicle side jack comprises an open-close lid on a vehicle body side face that is configured to open when the residence side plug is connected and to close after the residence side plug is disconnected.

5. The warm-up system of claim 2, wherein:
    a medium that flows through the engine cooling water circulation circuit is identical to a medium that flows through the residential hot water circuit, and
    the residential hot water circuit includes:
        a hot water circulation switch valve that switches circulation of the hot water to the vehicle when heat is to be transferred to the engine cooling water circulation circuit; and
        a circulation pump that circulates the hot water through the residential hot water circuit and the engine cooling water circulation circuit.

6. The warm-up system of claim 5, further comprising:
    a connector connection detection mechanism that detects whether the connector is in a connected state;
    a timer setting mechanism that sets a warm-up start time; and
    a plug-in warm-up control mechanism that switches the hot water circulation switch valve to the vehicle and drives the circulation pump to circulate the hot water between the residential hot water circuit and the engine cooling water circulation circuit when the connector is detected to be in the connected state by the connector connection detection mechanism and the warm-up start time, set by the timer setting mechanism, occurs after an automatic warm-up switch is switched ON.

7. The warm-up system of claim 1, wherein:
    a first medium flows through the engine cooling water circulation circuit and a second medium, that is different from the first medium, flows through the heat source circuit and
    heat from the heat source circuit is transferred to the engine cooling water circulation circuit using a heat exchanger.

8. The warm-up system of claim 7, wherein:
    the heat source circuit comprises the residential hot water circuit through which hot water stored in a tank flows, wherein the hot water is a different medium from a medium of the engine cooling water circulation circuit, and
    the residential hot water circuit includes:
        a warm-up heat exchanger that exchanges heat between engine cooling water and the hot water when heat is transferred to the engine cooling water circulation circuit;
        a heat exchange switch valve that switches between a state in which the hot water flows to a household heating and a state in which the hot water flows to the warm-up heat exchanger;
        a residence side circulation pump that circulates the hot water through the residential hot water circuit; and
        a vehicle side circulation pump that circulates the engine cooling water through the engine cooling water circulation circuit.

9. The warm-up system of claim 7, wherein:
the heat source circuit comprises the residential hot water circuit through which hot water stored in a tank flows, wherein the hot water is a different medium from a medium of the engine cooling water circulation circuit,
the engine cooling water circulation circuit comprises:
   a warm-up heat exchanger that exchanges heat between engine cooling water and residential hot water when heat is transferred to the engine cooling water circulation circuit; and
   a vehicle side circulation pump that circulates the engine cooling water that flows through the engine cooling water circulation circuit, and
the residential hot water circuit comprises:
   a heat exchange switch valve that switches to a state in which the hot water flows to the warm-up heat exchanger when heat is to be transferred to the engine cooling water circulation circuit; and
   a residence side circulation pump that circulates the hot water that flows through the residential hot water circuit.

10. The warm-up system of claim 1, wherein:
heat source circuit comprises a hot water circuit that circulates heat generated by electric power supplied by a power cable that is configured to connect to and disconnect from a commercial power source, and
the hot water circuit is in a transportable casing.

11. The warm-up system of claim 1, wherein:
a battery is installed in the vehicle,
the heat source circuit comprises a power cable that is configured to connect to and disconnect from a commercial power source, and
the connector transfers electric power supplied by the power cable to the battery when the engine cooling water circulation circuit and the heat source circuit are connected.

12. The warm-up system of claim 1, wherein:
the heat source circuit comprises a hot water circuit having a hot water circuit medium as a heat source that is compressed by a compressor operated by electric power supplied by a power cable that is configured to connect to and disconnect from a commercial power source,
the hot water circuit is in a transportable casing, and
the engine cooling water circulation circuit includes a warm-up heat exchanger that exchanges heat between engine cooling water and the hot water circuit medium, and a vehicle side circulation pump that circulates the engine cooling water through the engine cooling water circulation circuit.

13. The warm-up system of claim 1, wherein:
the vehicle comprises a plug-in hybrid vehicle having a charging connection mechanism for charging a battery installed in the vehicle using a commercial power source, and
the connector connects the engine cooling water circulation circuit to the residence side heat source circuit and connects the charging connection mechanism in a single connection operation.

14. The warm-up system of claim 13, wherein:
the heat source circuit comprises the residential hot water circuit through which hot water heated by the household heat source and stored in a tank flows,
a first branch pipe bifurcating from the engine cooling water circulation circuit includes a vehicle side jack on an end portion of the first branch pipe and a charging socket in a position of the vehicle side jack,
a second branch pipe bifurcating from the residential hot water circuit includes a residence side plug on an end portion of the second branch pipe and a charging plug in a position of the residence side plug,
the connector includes a vehicle side connector in which a hot water inflow pipe, a hot water outflow pipe, and the charging socket, are gathered, and a residence side connector in which a hot water inflow pipe, a hot water outflow pipe, and the charging plug, are gathered, and
the hot water inflow pipe, the hot water outflow pipe and the charging socket comprise the vehicle side jack and the hot water inflow pipe, the hot water outflow pipe and the charging plug comprise the residence side plug.

15. The warm-up system of claim 14, wherein the charging plug is on an upper side and the hot water inflow pipe and the hot water outflow pipe are on a lower side of the charging plug in the residence side connector.

16. The warm-up system of claim 15, wherein the residence side connector includes a partition plate that projects from an end surface of the residence side connector in an axial direction of the connector between the charging plug and the hot water inflow pipe and hot water outflow pipe.

17. The warm-up system of claim 15, wherein an outer periphery of an end portion gripped by an operator is covered by an electrical insulation layer in the residence side connector.

18. The warm-up system of claim 15, wherein the residence side connector includes a breaker that interrupts electrification of the charging plug during an electrical leak in a midway position of a charging power source circuit extending from the commercial power source to the charging plug.

19. A warm-up method for a vehicle power train, which pre-heats the vehicle power train by transferring heat from a heat source to an engine cooling water circulation circuit, that includes a heat source circuit, that circulates heat from a medium in a household heat source, and a connector in the engine cooling water circulation circuit and the heat source circuit configured to connect and disconnect the engine cooling water circulation circuit and the heat source circuit, the warm-up method comprising:
   connecting the engine cooling water circulation circuit to the heat source circuit the connector prior to start-up of the vehicle power train;
   transferring heat from the heat source circuit to the engine cooling water circulation circuit through the connector by the flow of the medium when the engine cooling water circulation circuit and the heat source circuit are connected; and
   disconnecting the engine cooling water circulation circuit from the heat source circuit after the heat is transferred to side the engine cooling water circulation circuit.

* * * * *